US011340615B2

(12) United States Patent
Liu et al.

(10) Patent No.: US 11,340,615 B2
(45) Date of Patent: May 24, 2022

(54) CONCURRENT RELOCATION AND REINITIALIZATION OF VSLAM

(71) Applicant: QUALCOMM Incorporated, San Diego, CA (US)

(72) Inventors: Xiaohui Liu, Lund (SE); Yibo Jiang, Shanghai (CN); Yanming Zou, Beijing (CN); Lei Xu, Beijing (CN); Jiangtao Ren, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 229 days.

(21) Appl. No.: 16/641,730

(22) PCT Filed: Oct. 6, 2017

(86) PCT No.: PCT/CN2017/105270
§ 371 (c)(1),
(2) Date: Feb. 25, 2020

(87) PCT Pub. No.: WO2019/068222
PCT Pub. Date: Apr. 11, 2019

(65) Prior Publication Data
US 2020/0241536 A1    Jul. 30, 2020

(51) Int. Cl.
*G01C 21/20* (2006.01)
*G05D 1/02* (2020.01)
*G06T 7/73* (2017.01)

(52) U.S. Cl.
CPC ........... *G05D 1/0212* (2013.01); *G01C 21/20* (2013.01); *G06T 7/73* (2017.01)

(58) Field of Classification Search
CPC ........ G01C 21/20; G01C 21/32; G01C 21/16; G01C 21/165; G05D 1/0212;
(Continued)

(56) References Cited

U.S. PATENT DOCUMENTS 9,527,212 B2    12/2016  Artes et al.
2012/0194644 A1  8/2012  Newcombe et al.
(Continued)

FOREIGN PATENT DOCUMENTS

CN    105513083 A    4/2016
CN    106885574 A    6/2017

OTHER PUBLICATIONS

International Search Report and Written Opinion—PCT/CN2017/105270—International Searching Authority—dated Jun. 27, 2018, 10 pages.

(Continued)

*Primary Examiner* — Abbyy Y Lin
*Assistant Examiner* — Hossam M Abd El Latif
(74) *Attorney, Agent, or Firm* — Polsinelli LLP

(57) ABSTRACT

Various embodiments include processing devices and methods for relocation and reinitialization for a robotic device. Various embodiments may include concurrently relocating a second pose of the robotic device and reinitializing a third pose of the robotic device in response to failing to determine a first pose of the robotic device in the environment and determining that tracking of the robotic device is lost. Various embodiments may include pre-relocating a second pose of the robotic device in the environment in response to failing to determine the first pose of the robotic device in the environment and determining that tracking of the robotic device is lost, relocating a third pose of the robotic device in response to successfully pre-relocating the second pose of the robotic device, and reinitializing a fourth pose of the robotic device in response to unsuccessfully pre-relocating the second pose of the robotic device.

34 Claims, 11 Drawing Sheets

(58) Field of Classification Search
CPC ...... G05D 1/0274; G05D 1/0246; G06K 9/00; G06T 7/73; G06T 7/70; G06T 7/246; G06T 2207/30244; G06T 2207/30252; G06T 2207/10016
USPC .......................................................... 701/25
See application file for complete search history.

(56) References Cited

U.S. PATENT DOCUMENTS

| | | | |
|---|---|---|---|
| 2013/0138246 A1 | 5/2013 | Gutmann et al. | |
| 2015/0098614 A1 | 4/2015 | Gee et al. | |
| 2016/0246302 A1 | 8/2016 | Liao et al. | |
| 2017/0255203 A1 | 9/2017 | Sofman et al. | |
| 2018/0111265 A1* | 4/2018 | DelSpina | A61B 90/30 |
| 2019/0234746 A1* | 8/2019 | Zhang | G01C 21/16 |
| 2021/0096579 A1* | 4/2021 | Artes | G05D 1/0274 |

OTHER PUBLICATIONS

Glocker B., et al., "Real-Time RGB-D Camera Relocalization Via Randomized Ferns for Keyframe Encoding", IEEE Transactions on Visualization and Computer Graphics, IEEE Service Center, Los Alamitos, CA, US, vol. 21, No. 5, May 1, 2015 (May 1, 2015), pp. 571-583, XP011576671, ISSN: 1077-2626, DOI: 10.1109/TVCG.2014.2360403, [retrieved on Mar. 25, 2015], Abstract, Sections 1.1. 1.1.1. 2.6. 3. 3.4, Figure 2.

Liu H., et al., "A Novel Re-Tracking Strategy for Monocular SLAM", 2017 IEEE International Conference on Acoustics, Speech and Signal Processing (ICASSP), IEEE, Mar. 5, 2017 (Mar. 5, 2017), pp. 1942-1946, XP033258755, DOI: 10.1109/ICASSP.2017.7952495, [retrieved on Jun. 16, 2017] Abstract, Figures 1-3, p. 1942 (start) to p. 1944 (end of LHS column).

Supplementary European Search Report—EP17928069—Search Authority—Munich—dated Feb. 2, 2021.

Supplementary European Search Report—EP17928069—Search Authority—Munich—dated Jun. 2, 2021.

Williams B., et al. "Automatic Relocalization and Loop Closing for Real-Time Monocular SLAM," Pattern Analysis and Machine Intelligence, IEEE Transactions, 2011, vol. 33(9), Sep. 1, 2011 (Sep. 1, 201), pp. 1699-1712, XP011409150, ISSN: 0162-8828. DOI:10.1109/TPAMI.2011.41, Abstract. Section 6.1.

Williams B., et al., "Real-Time SLAM Relocalisation", ICCV 2007, IEEE 11th International Conference on Computer Vision, 2007, IEEE, Oct. 1, 2007 (Oct. 1, 2007), pp. 1-8, XP031194604, ISBN: 978-1-4244-1630-1, Abstact, p. 1 (start) to p. forth page (end).

* cited by examiner

CONCURRENT RELOCATION AND REINITIALIZATION OF VSLAM

BACKGROUND

Robotic devices are being developed for a wide range of applications. Robotic devices may be equipped with cameras capable of capturing an image, a sequence of images, or video. Some robotic devices may be equipped with a monocular image sensor, such as a monocular camera.

Robotic devices may perform simultaneous localization and mapping (SLAM) to construct and update a map of an unknown environment while simultaneously keeping track of the robotic device's location within the environment. A robotic device may gather data useful for visual SLAM (VSLAM) using its image sensor device. However, robotic devices implementing VSLAM may lose tracking due to bad illumination, a featureless environment, and a moving object.

SUMMARY

Various embodiments include methods, as well as robotic devices and processing devices executing such methods, for relocation and reinitialization of a robotic device.

Various embodiments may include determining a first pose of the robotic device in an environment, determining whether tracking of the robotic device is lost, and concurrently relocating a second pose of the robotic device and reinitializing a third pose of the robotic device in response to failing to determine the first pose of the robotic device in the environment and determining that tracking of the robotic device is lost.

Various embodiments may further include determining whether relocating the second pose of the robotic device is successful, terminating reinitializing the third pose of the robotic device in response to determining that relocating the second pose of the robotic device is successful, determining whether reinitializing the third pose of the robotic device is successful, and terminating relocating the second pose of the robotic device in response to determining that reinitializing the third pose of the robotic device is successful.

Various embodiments may further include determining whether relocating the second pose of the robotic device is successful, relocating the second pose of the robotic device in response to determining that relocating the second pose of the robotic device is unsuccessful, determining whether reinitializing the third pose of the robotic device is successful, and reinitializing the third pose of the robotic device in response to determining that reinitializing the third pose of the robotic device is unsuccessful.

In some embodiments, relocating a second pose of the robotic device may include capturing sensor data of a first feature of the environment, comparing the captured sensor data with stored sensor data for a plurality of features of the environment, identify a second feature of the environment from the plurality of features of the environment having stored sensor data matching the captured sensor data, locating the first feature of the environment in relation to the second feature of the environment, determining the second pose of the robotic device in relation to the environment, and tracking the robotic device based on the second pose of the robotic device.

Various embodiments may further include retrieving stored descriptor-based features of the second feature of the environment, and comparing the stored descriptor-based features of the second feature of the environment with the captured sensor data. In such embodiments, locating the first feature of the environment in relation to the second feature of the environment may include locating the first feature of the environment in relation to the second feature of the environment based on comparing the stored descriptor-based features of the second feature of the environment with the captured sensor data.

In some embodiments, reinitializing a third pose of the robotic device may include retrieving a fourth pose of the robotic device that was obtained before tracking of the robotic device was lost, retrieving sensor data captured since tracking of the robotic device was lost, and reinitializing the third pose of the robotic device using the fourth pose of the robotic device and the sensor data captured since tracking of the robotic device was lost.

Various embodiments may further include determining the third pose of the robotic device in relation to the environment, and correlating the third pose of the robotic device with a stored map of the environment.

Various embodiments may include determining a first pose of the robotic device in an environment, determining whether tracking of the robotic device is lost, pre-relocating a second pose of the robotic device in the environment in response to failing to determine the first pose of the robotic device in the environment and determining that tracking of the robotic device is lost, relocating a third pose of the robotic device in response to successfully pre-relocating the second pose of the robotic device, and reinitializing a fourth pose of the robotic device in response to unsuccessfully pre-relocating the second pose of the robotic device.

In some embodiments, pre-relocating a second pose of the robotic device in the environment may include retrieving a fifth pose of the robotic device on a planned path to a next goal, retrieving stored sensor data associated with the fifth pose of the robotic device, retrieving stored descriptor-based features of a first feature of the environment associated with the fifth pose of the robotic device, determining whether the descriptor-based features of the first feature exceeds a feature threshold, indicating that pre-relocating the second pose of the robotic device is successful in response to determining that the descriptor-based features of the first feature exceeds the feature threshold, and indicating that pre-relocating the second pose of the robotic device is unsuccessful in response to determining that the descriptor-based features of the first feature do not exceed the feature threshold.

Various embodiments may further include determining whether relocating the third pose of the robotic device is successful, tracking the robotic device based on the third pose of the robotic device in response to determining that relocating the third pose of the robotic device is successful, determining whether reinitializing the fourth pose of the robotic device is successful, and tracking the robotic device based on the fourth pose of the robotic device in response to determining that reinitializing the fourth pose of the robotic device is successful.

Various embodiments may further include determining whether relocating the third pose of the robotic device is successful, relocating the third pose of the robotic device in response to determining that relocating the third pose of the robotic device is unsuccessful, determining whether reinitializing the fourth pose of the robotic device is successful, and reinitializing the fourth pose of the robotic device in response to determining that reinitializing the fourth pose of the robotic device is unsuccessful.

In some embodiments, relocating a third pose of the robotic device may include capturing sensor data of a first feature of the environment, comparing the captured sensor data with stored sensor data associated with a second feature of the environment associated with a fifth pose of the robotic device on a planned path to a next goal, locating the first feature of the environment in relation to the second feature of the environment, determining the third pose in relation to the environment, and tracking the robotic device based on the third pose.

Various embodiments may further include retrieving stored descriptor-based features of the second feature of the environment, and comparing the stored descriptor-based features of the second feature of the environment with the captured sensor data, in which locating the first feature of the environment in relation to the second feature of the environment may include locating the first feature of the environment in relation to the second feature of the environment based on comparing the stored descriptor-based features of the second feature of the environment with the captured sensor data.

In some embodiments reinitializing a fourth pose of the robotic device may include retrieving a fifth pose of the robotic device that was obtained tracking of the robotic device was lost, retrieving sensor data captured since tracking of the robotic device was lost, reinitializing the fourth pose of the robotic device using the fifth pose of the robotic device and the sensor data captured since tracking of the robotic device was lost, determining the fourth pose in relation to the environment, and correlating the fourth pose with a stored map of the environment.

Further embodiments include a robotic device including a sensor, a memory, and a processor configured with processor-executable instructions to perform operations of any of the methods summarized above. Further embodiments include a robotic device including means for performing functions of any of the methods summarized above. Further embodiments include a processing device for use in a robotic device configured to perform operations of any of the methods summarized above Further embodiments include a non-transitory processor-readable medium on which are stored processor-executable instructions configured to cause a processor of a robotic device to perform operations of any of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
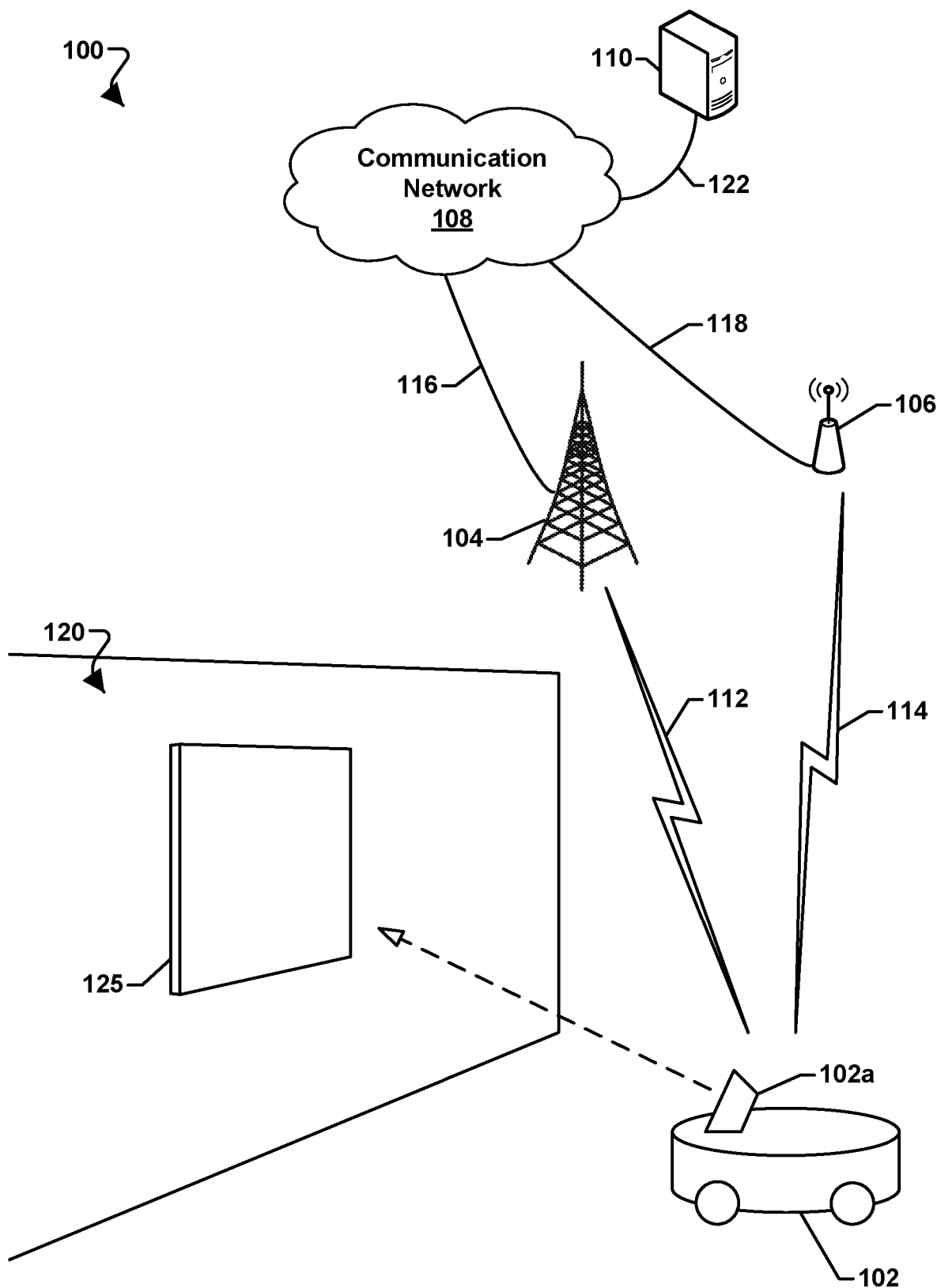
FIG. 1 is a system block diagram of a robotic device operating within communication system according to various embodiments.

Various embodiments will be described in detail with reference to the accompanying drawings. Wherever possible, the same reference members will be used throughout the drawings to refer to the same or like parts. References made to particular examples and embodiments are for illustrative purposes, and are not intended to limit the scope of the claims.

As used herein, the term "robotic device" refers to one of various types of devices including an onboard processing device configured to provide some autonomous or semi-autonomous capabilities. Examples of robotic devices include but are not limited to: aerial vehicles, such as an unmanned aerial vehicle (UAV) or drone; ground-based robots and vehicles (e.g., an autonomous or semi-autonomous robot, a vacuum robot, autonomous or semi-autonomous motor vehicles, etc.); water-based devices (i.e., vehicles configured for operation on the surface of the water or under water); space-based devices (e.g., a spacecraft or space probe); and/or some combination thereof. In some embodiments, the robotic device may be manned. In other embodiments, the robotic device may be unmanned. In embodiments in which the robotic device is autonomous, the robotic device may include an onboard computing device configured to maneuver and/or navigate the robotic device without remote operating instructions (i.e., autonomously), such as from a human operator (e.g., via a remote computing device). In embodiments in which the robotic device is semi-autonomous, the robotic device may include an onboard computing device configured to receive some information or instructions, such as from a human operator (e.g., via a remote computing device), and autonomously maneuver and/or navigate the robotic device consistent with the received information or instructions. In some implementations, the robotic device may be an aerial device (unmanned or manned), which may be a rotorcraft or winged aircraft. For example, a rotorcraft (also referred to as a multirotor or multicopter) may include a plurality of propulsion units (e.g., rotors/propellers) that provide propulsion and/or lifting forces for the robotic device. Specific non-limiting examples of rotorcraft include tricopters (three rotors), quadcopters (four rotors), hexacopters (six rotors), and octocopters (eight rotors). However, a rotorcraft may include any number of rotors. A robotic device may include a variety of components and/or payloads that may perform a variety of functions.

Robotic devices may employ simultaneous localization and mapping (SLAM) techniques to construct and update a map of an unknown environment while simultaneously keeping track of the robotic device's location within the environment. Robotic devices are increasingly equipped with image sensor devices for capturing images and video. In some embodiments, the image sensor device may include a monocular image sensor (e.g., a monocular camera). A robotic device may gather data useful for SLAM using the image sensor device. A robotic device using the image sensor device to gather data useful for SLAM may implement visual SLAM (VSLAM). A robotic device may include any number of additional sensors, e.g., wheel encoder, inertial measurement unit (EMU), infrared (IR) sensor, sonar sensor, bumper sensor, LIDAR sensor, etc., to improve accuracy and/or robustness for VSLAM.

For robotic devices equipped with a monocular image sensor, the image sensor may be unable to provide sufficient information to enable the processing device to determine both a robotic device pose (position and orientation) and map points for the environment. A robotic device implementing VSLAM may lose tracking in an abnormal environment due to bad illumination, a featureless environment, a moving object, and/or an unfamiliar environment. Resuming tracking and localization until and upon getting back to a normal and/or known environment is difficult for a robotic device implementing VSLAM.

Various embodiments may improve the localization and tracking of a robotic devices encountering an abnormal environment causing the robotic device to lose tracking. Specifically, various embodiments may use multiple techniques to improve the likelihood and speed of resuming tracking until and upon getting back to a normal and/or known environment. The various methods may thus enable the relocation and/or reinitialization of a pose of the robotic device. The various methods may implement concurrent relocation and/or reinitialization of a pose to improve the likelihood and speed with which the pose of the robotic device may be determined and tracking may be resumed. The various methods may implement pre-relocation of a pose of the robotic device based on a pose along a path that is planned to reach a next goal to determine the likelihood of successful relocation that may be used to select between relocation and reinitialization and improve the likelihood and speed with which the pose of the robotic device may be determined and tracking may be resumed.

Various embodiments may provide devices and methods for storing sensor data and map data in a manner in which the data may be shared among multiple modules configured for relocating and reinitializing a pose of a robotic device. Storing the sensor data and map data for shared access by the multiple modules configured for relocating and reinitializing the pose may reduce memory requirements for storing and using the sensor data and map data.

Various embodiments may include devices and methods for correlating a relocated and/or reinitialized pose of a robotic device to stored sensor data and map data. The sensor data and map data may be correlated to a single world coordinate system to improve the speed and accuracy with which the pose of the robotic device may be determined and tracking may be resumed. Various embodiments may correlate the relocated and/or reinitialized pose with the sensor data and map data in the single world coordinate system.

Various embodiments may provide a technical improvement to known techniques by enabling fast relocation and/or reinitialization of a pose of a robotic device in an abnormal environment. Various embodiments may improve the speed of relocation and/or reinitialization of the pose by executing concurrent processes to relocate and reinitialize the pose, by executing pre-relocation of the pose to select between relocation and reinitialization of the pose, by reducing memory requirements for relocation and/or reinitialization of the pose, and by correlating the relocated and/or reinitialized pose with stored sensor data and map data within a single world coordinate system.

Various embodiments may be implemented within a robotic device operating within a variety of communication systems 100, an example of which is illustrated in FIG. 1. With reference to FIG. 1, the communication system 100 may include a robotic device 102, a base station 104, an access point 106, a communication network 108, and a network element 110. In some embodiments, the robotic device 102 may be equipped with an image sensor 102a. In some embodiments, the image sensor 102a may include a monocular image sensor.

The base station 104 and the access point 106 may provide wireless communications to access the communication network 108 over a wired and/or wireless communication backhaul 116 and 118, respectively. The base station 104 may include base stations configured to provide wireless communications over a wide area (e.g., macro cells), as well as small cells, which may include a micro cell, a femto cell, a pico cell, and other similar network access points. The access point 106 may include access points configured to provide wireless communications over a relatively smaller area. Other examples of base stations and access points are also possible.

The robotic device 102 may communicate with the base station 104 over a wireless communication link 112, and with the access point 106 over a wireless communication link 114. The wireless communication links 112 and 114 may include a plurality of carrier signals, frequencies, or frequency bands, each of which may include a plurality of logical channels. The wireless communication links 112 and 114 may utilize one or more radio access technologies (RATs). Examples of RATs that may be used in a wireless communication link include 3GPP Long Term Evolution (LTE), 3G, 4G, 5G, Global System for Mobility (GSM), Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

The network element 110 may include a network server or another similar network element. The network element 110 may communicate with the communication network 108 over a communication link 122. The robotic device 102 and the network element 110 may communicate via the communication network 108. The network element 110 may provide the robotic device 102 with a variety of information, such as navigation information, weather information, information about local air, ground, and/or sea traffic, movement control instructions, and other information, instructions, or commands relevant to operations of the robotic device 102.

In various embodiments, the robotic device 102 may move in an environment 120. In some embodiments, the robotic device may use the image sensor 102a to capture one or more images of a target image 125 in the environment 120. In some embodiments, the target image 125 may include a test image, which may include known characteristics, such as a height and a width.

Figure 2:
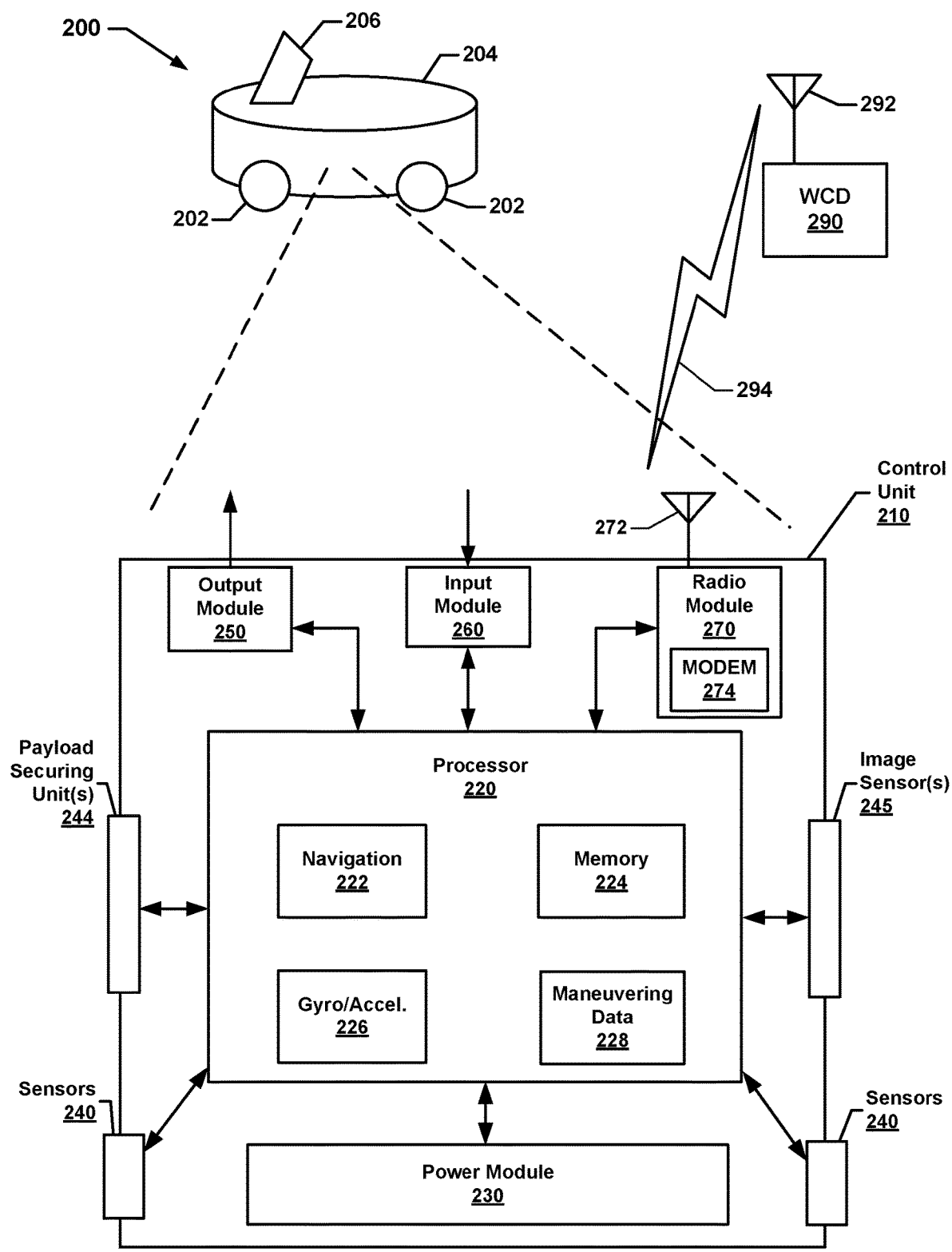
FIG. 2 is a component block diagram illustrating components of a robotic device according to various embodiments.

Robotic devices may include winged or rotorcraft varieties. FIG. 2 illustrates an example robotic device 200 of a ground vehicle design that utilizes one or more wheels 202 driven by corresponding motors to provide locomotion to the robotic device 200. The robotic device 200 is illustrated as an example of a robotic device that may utilize various embodiments, but is not intended to imply or require that various embodiments are limited to ground robotic devices. For example, various embodiments may be used with rotorcraft or winged robotic devices, water-borne robotic devices, and space-based robotic devices.

With reference to FIGS. 1 and 2, the robotic device 200 may be similar to the robotic device 102. The robotic device 200 may include a number of wheels 202, a body 204, and an image sensor 206. A frame (not shown) may provide structural support for the motors and their associated wheels 202 as well as for the image sensor 206. For ease of description and illustration, some detailed aspects of the robotic device 200 are omitted such as wiring, frame structure interconnects, or other features that would be known to one of skill in the art. While the illustrated robotic device 200 has wheels 202, this is merely exemplary and various embodiments may include any variety of components to provide propulsion and maneuvering capabilities, such as treads, paddles, skids, or any combination thereof or of other components.

The robotic device 200 may further include a control unit 210 that may house various circuits and devices used to power and control the operation of the robotic device 200. The control unit 210 may include a processor 220, a power module 230, sensors 240, one or more payload securing units 244, one or more image sensors 245, an output module 250, an input module 260, and a radio module 270.

The processor 220 may be configured with processor-executable instructions to control travel and other operations of the robotic device 200, including operations of various embodiments. The processor 220 may include or be coupled to a navigation unit 222, a memory 224, a gyro/accelerometer unit 226, and a maneuvering data module 228. The processor 220 and/or the navigation unit 222 may be configured to communicate with a server through a wireless connection (e.g., a cellular data network) to receive data useful in navigation, provide real-time position reports, and assess data.

The maneuvering data module 228 may be coupled to the processor 220 and/or the navigation unit 222, and may be configured to provide travel control-related information such as orientation, attitude, speed, heading, and similar information that the navigation unit 222 may use for navigation purposes, such as dead reckoning between Global Navigation Satellite System (GNSS) position updates. The gyro/accelerometer unit 226 may include an accelerometer, a gyroscope, an inertial sensor, an inertial measurement unit (IMU), or other similar sensors. The maneuvering data module 228 may include or receive data from the gyro/accelerometer unit 226 that provides data regarding the orientation and accelerations of the robotic device 200 that may be used in navigation and positioning calculations, as well as providing data used in various embodiments for processing images.

The processor 220 may further receive additional information from one or more image sensors 245 (e.g., a camera, which may be a monocular camera) and/or other sensors 240. In some embodiments, the image sensor(s) 245 may include an optical sensor capable of infrared, ultraviolet, and/or other wavelengths of light. The sensors 240 may also include a wheel sensor, a radio frequency (RF) sensor, a barometer, a sonar emitter/detector, a radar emitter/detector, a microphone or another acoustic sensor, or another sensor that may provide information usable by the processor 220 for movement operations as well as navigation and positioning calculations. The sensors 240 may include contact or pressure sensors that may provide a signal that indicates when the robotic device 200 has made contact with a surface. The payload securing units 244 may include an actuator motor that drives a gripping and release mechanism and related controls that are responsive to the control unit 210 to grip and release a payload in response to commands from the control unit 210.

The power module 230 may include one or more batteries that may provide power to various components, including the processor 220, the sensors 240, the payload-securing unit(s) 244, the image sensor(s) 245, the output module 250, the input module 260, and the radio module 270. In addition, the power module 230 may include energy storage components, such as rechargeable batteries. The processor 220 may be configured with processor-executable instructions to control the charging of the power module 230 (i.e., the storage of harvested energy), such as by executing a charging control algorithm using a charge control circuit. Alternatively or additionally, the power module 230 may be configured to manage its own charging. The processor 220 may be coupled to the output module 250, which may output control signals for managing the motors that drive the wheels 202 and other components.

The robotic device 200 may be controlled through control of the individual motors of the wheels 202 as the robotic device 200 progresses toward a destination. The processor 220 may receive data from the navigation unit 222 and use such data in order to determine the present position and orientation of the robotic device 200, as well as the appropriate course towards the destination or intermediate sites. In various embodiments, the navigation unit 222 may include a GNSS receiver system (e.g., one or more global positioning system (GPS) receivers) enabling the robotic device 200 to navigate using GNSS signals. Alternatively or in addition, the navigation unit 222 may be equipped with radio navigation receivers for receiving navigation beacons or other signals from radio nodes, such as navigation beacons (e.g., very high frequency (VHF) omni-directional range (VOR) beacons), access points, cellular network sites, radio station, remote computing devices, other robotic devices, etc.

The radio module 270 may be configured to receive navigation signals, such as signals from aviation navigation facilities, etc., and provide such signals to the processor 220 and/or the navigation unit 222 to assist in robotic device navigation. In various embodiments, the navigation unit 222 may use signals received from recognizable RF emitters (e.g., AM/FM radio stations, Wi-Fi access points, and cellular network base stations) on the ground.

The radio module 270 may include a modem 274 and a transmit/receive antenna 272. The radio module 270 may be configured to conduct wireless communications with a variety of wireless communication devices (e.g., a wireless communication device (WCD) 290), examples of which include a wireless telephony base station or cell tower (e.g., the base station 104), a network access point (e.g., the access point 106), a beacon, a smartphone, a tablet, or another computing device with which the robotic device 200 may communicate (such as the network element 110). The processor 220 may establish a bi-directional wireless communication link 294 via the modem 274 and the antenna 272 of the radio module 270 and the wireless communication device 290 via a transmit/receive antenna 292. In some embodiments, the radio module 270 may be configured to support multiple connections with different wireless communication devices using different radio access technologies.

In various embodiments, the wireless communication device 290 may be connected to a server through intermediate access points. In an example, the wireless communication device 290 may be a server of a robotic device operator, a third party service (e.g., package delivery, billing, etc.), or a site communication access point. The robotic device 200 may communicate with a server through one or more intermediate communication links, such as a wireless telephony network that is coupled to a wide area network (e.g., the Internet) or other communication devices. In some embodiments, the robotic device 200 may include and employ other forms of radio communication, such as mesh connections with other robotic devices or connections to other information sources (e.g., balloons or other stations for collecting and/or distributing weather or other data harvesting information).

In various embodiments, the control unit 210 may be equipped with an input module 260, which may be used for a variety of applications. For example, the input module 260 may receive images or data from an onboard camera or sensor, or may receive electronic signals from other components (e.g., a payload).

Figure 3:
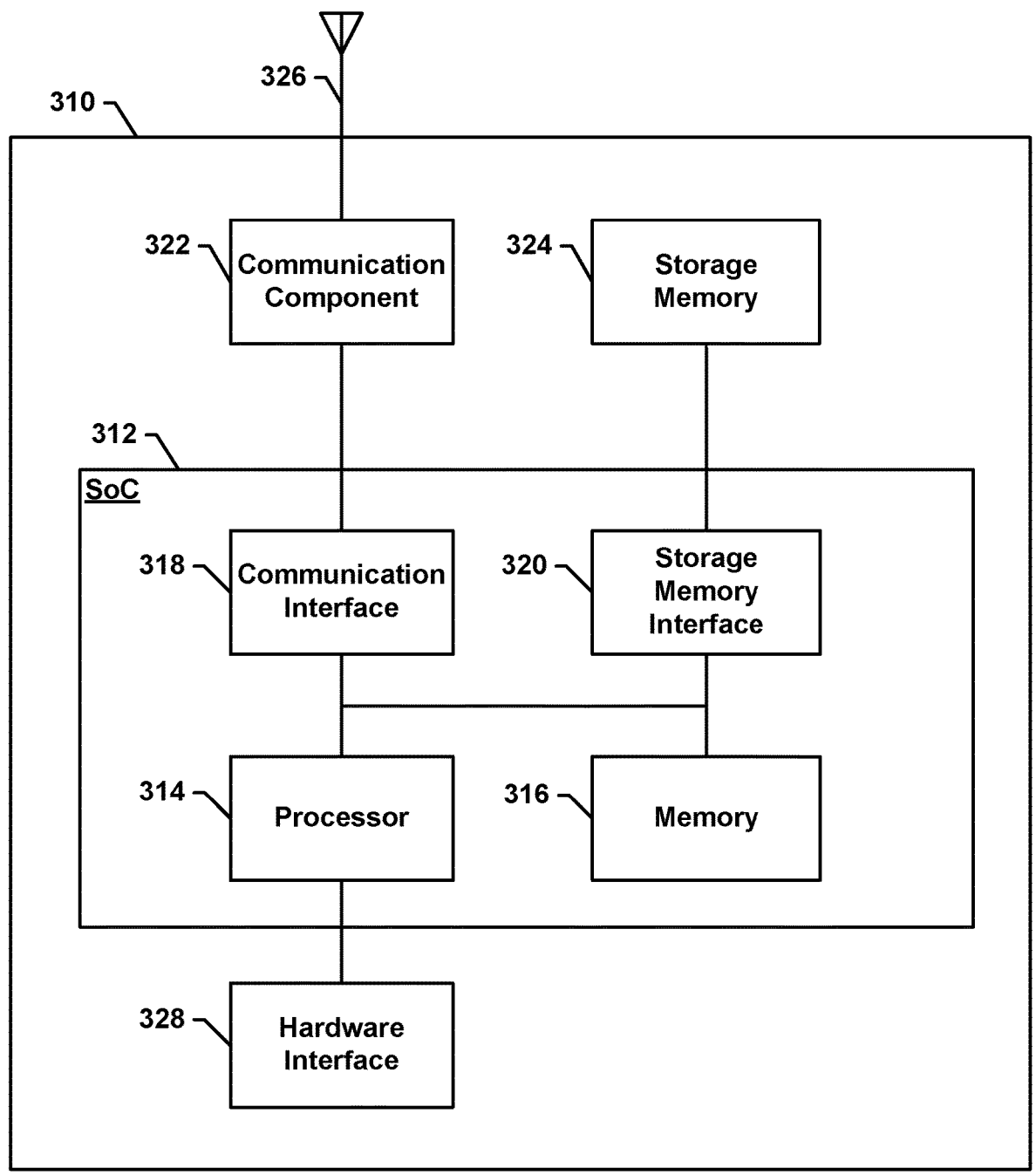
FIG. 3 is a component block diagram illustrating a processing device suitable for use in robotic devices implementing various embodiments.

While various components of the control unit 210 are illustrated in FIG. 2 as separate components, some or all of the components (e.g., the processor 220, the output module 250, the radio module 270, and other units) may be integrated together in a single processing device 310, an example of which is illustrated in FIG. 3.

With reference to FIGS. 1-3, the processing device 310 may be configured to be used in a robotic device and may be configured as or including a system-on-chip (SoC) 312, The SoC 312 may include (but is not limited to) a processor 314, a memory 316, a communication interface 318, and a storage memory interface 320. The processing device 310 or the SoC 312 may further include a communication component 322, such as a wired or wireless modem, a storage memory 324, an antenna 326 for establishing a wireless communication link, and/or the like. The processing device 310 or the SoC 312 may further include a hardware interface 328 configured to enable the processor 314 to communicate with and control various components of a robotic device. The processor 314 may include any of a variety of processing devices, for example any number of processor cores.

The term "system-on-chip" (SoC) is used herein to refer to a set of interconnected electronic circuits typically, but not exclusively, including one or more processors (e.g., 314), a memory (e.g., 316), and a communication interface (e.g., 318). The SoC 312 may include a variety of different types of processors 314 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. The SoC 312 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The SoC 312 may include one or more processors 314. The processing device 310 may include more than one SoC 312, thereby increasing the number of processors 314 and processor cores. The processing device 310 may also include processors 314 that are not associated with an SoC 312 (i.e., external to the SoC 312). Individual processors 314 may be multicore processors. The processors 314 may each be configured for specific purposes that may be the same as or different from other processors 314 of the processing device 310 or SoC 312. One or more of the processors 314 and processor cores of the same or different configurations may be grouped together. A group of processors 314 or processor cores may be referred to as a multi-processor cluster.

The memory 316 of the SoC 312 may be a volatile or non-volatile memory configured for storing data and processor-executable instructions for access by the processor 314. The processing device 310 and/or SoC 312 may include one or more memories 316 configured for various purposes. One or more memories 316 may include volatile memories such as random access memory (RAM) or main memory, or cache memory.

Some or all of the components of the processing device 310 and the SoC 312 may be arranged differently and/or combined while still serving the functions of the various aspects. The processing device 310 and the SoC 312 may not be limited to one of each of the components, and multiple instances of each component may be included in various configurations of the processing device 310.

Figure 4:
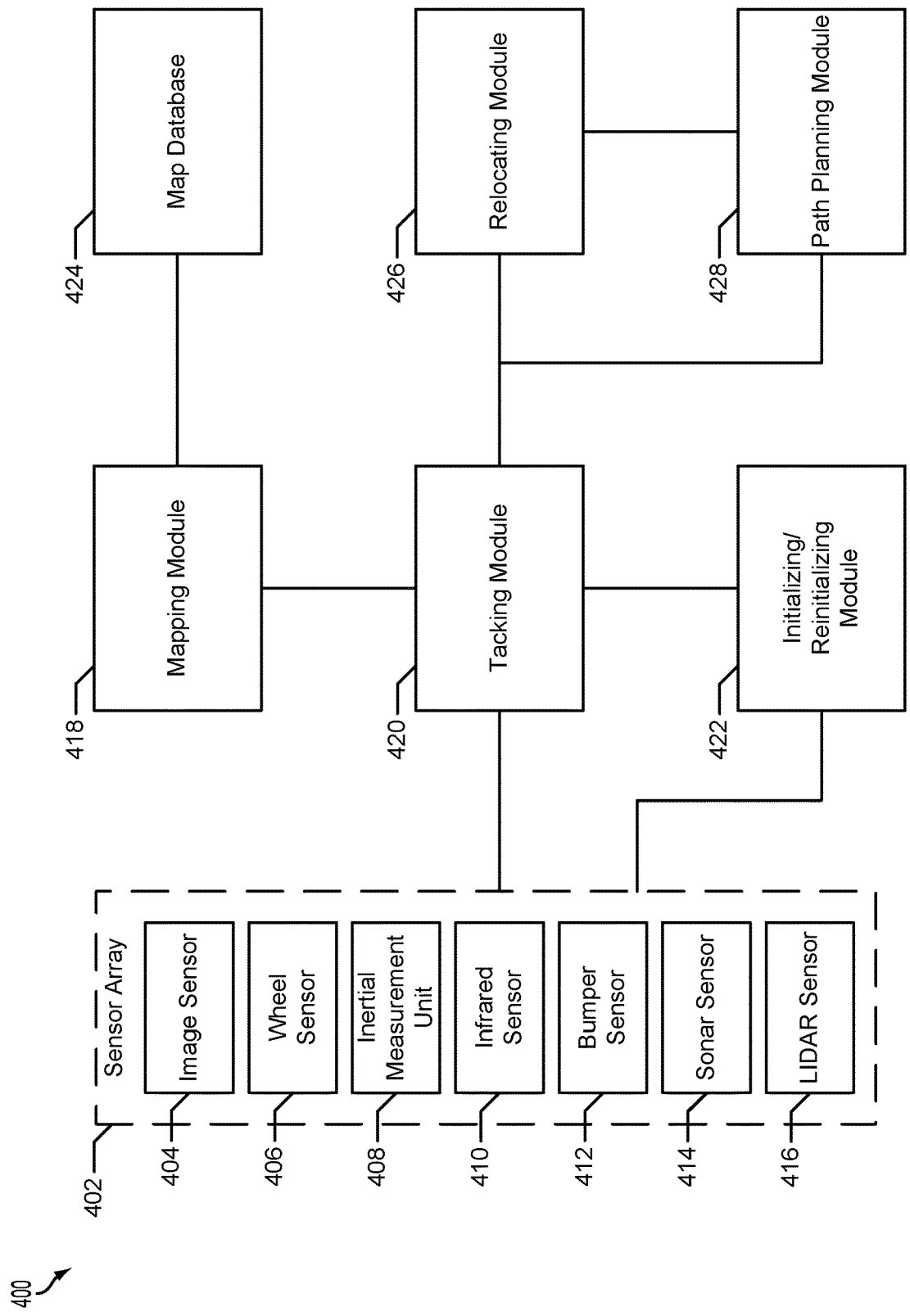
FIG. 4 is a component block diagram illustrating components of a relocation and reinitialization system of a robotic device suitable for use with various embodiments.

FIG. 4 illustrates a relocation and reinitialization system 400 of a robotic device suitable for use with various embodiments. With reference to FIGS. 1-4 the relocation and reinitialization system 400 may be implemented in hardware components and/or software components of the robotic device (e.g., 102, 200), the operation of which may be controlled by one or more processors (e.g., the processor 220, the processing device 310, the SoC 312, and/or the like) of the robotic device.

A sensor array 402 may include any number and combination of sensors, such as an image sensor 404, a wheel sensor 406, an inertial measurement unit (IMU) 408, infrared sensor 410, bumper sensor 412, sonar sensor 414, LIDAR sensor 4:1.6, etc. Each sensor 404-416 of the sensor array 402 may capture sensor data that may be used for tracking and mapping the robotic device within a real-world environment (e.g., 125, 500) and a coordinate world system.

A tracking module 420 may be configured to calculate a pose of the robotic device and calculate maps for the environment in real time. In various embodiments, the pose and/or maps may be calculated in relation to the coordinate world system. In various embodiments, the pose and/or maps may be calculated in relation to previous calculated poses and correlated with the coordinate world system by another module of the relocation and reinitialization system 400, such as mapping module 418. The tracking module may receive the sensor data from the sensors 404-416 and calculate the pose of the robotic device and calculate the maps for the environment using the received sensor data.

The tracking module 420 may calculate the pose of the robotic device. In various embodiments, the pose of the robotic device may be calculated based on a relation between a specific area of the robotic device and any number and combination of the sensors 404-416 and/or the sensor array 402. In other words, a pose of any number and combination of the sensors 404-416 and/or the sensor array 402 may be converted to a pose of the robotic device based on the relation. For example, a pose for a robotic device may be configured to specify; a pose for a center point of the robotic device. A sensor 404-416 may be located at a location on the robotic device other than the center point of the robotic device a specific distance and orientation from the center point of the robotic device. The tracking module 420 may calculate the pose of the sensor 404-416 and adjust the pose of the sensor 404-416 by the specific distance and orientation to calculate the pose of the robotic device. Similar calculations may be made to calculate the pose of the sensor array 402 and of multiple sensors 404-416. In various embodiments, calculating a pose for multiple sensors 404-416 may include calculating a pose for a location relative to the multiple sensors 404-416, such as a midway point between the multiple sensors 404-416. In various embodiments, the pose of the robotic device may be the same as the pose for any number and combination of the sensors 404-416 and/or the sensor array 402.

The tracking module 420 may calculate maps of the environment in which the robotic device moves. In various embodiments, the maps may be calculated based on relations between calculated poses of the robotic device. For example, a robotic device may move throughout an environment and multiple poses may be calculated for different locations and/or orientations of the robotic device within the environment. In various embodiments, the maps may be calculated by correlating the poses in relation to each other. The calculations may be made based on the differences in location and orientation of any number and combination of poses. In various embodiments, the maps may be calculated by correlating the poses in relation to sensor data. In various embodiments, calculations may be made based on a pose and sensor data received from any number and combination of sensors 404-416 preceding and/or following calculation of the pose.

The tracking module 420 may also be configured to identify descriptor-based features of the sensor data and associate the descriptor-based features with the poses in the maps. The descriptor-based features may be features of the sensor data that may be used to identify an item and/or an area of the environment. For example, a particular pattern of sensor data may indicate a corner in the environment, and the tracking module 420 may be configured to identify the pattern of sensor data, identify the pattern of sensor data as indicating a corner, and associate a descriptor-based feature of a corner with the sensor data and pose in the map. Descriptor-based features may also indicate locations of an item and/or an area in a multidimensional space, such as a height from a reference point; an orientation of an item and/or an area in the environment; and/or a feature of the sensor data that may not be indicative of a specific item and/or specific area but that is otherwise noteworthy, for example, a sensor data feature exceeding a designated threshold, like a lack of sensor data below and angle threshold may indicate an unknown slope or drop that may be a ramp, staircase, ledge, etc.

The tracking module 420 may lose tracking of the robotic device. In other words, the tracking module 420 may not be able to use the sensor data received from the sensors 404-416 to calculate a pose and/or map for the robotic device. The sensor data may be insufficient in amount and/or quality, and/or may not be recognized by the tracking module 420. In various embodiments, the sensors 404-416 may capture and provide sensor data that is too saturated, not saturated enough, indistinct, and/or unrecognizable to the tracking module 420, and the tracking module 420 may be unable to calculate a pose and/or map for the robotic device. In various embodiments, described further herein, the tracking module 420 may receive a pose and/or map for the robotic device from an initializing/reinitializing module 422 and/or a relocating module 426. The tracking module 420 may restart and/or continue tracking and mapping for the robotic device from the received pose.

A mapping module 418 may be configured to manage map data. In various embodiments, managing map data may include map construction, optimization, and/or destruction. The mapping module 418 may receive calculated maps from the tracking module 420 and/or stored maps from map database 424 configured to store maps. The maps may include map data, which may include received and/or stored sensor data captured by the sensors 404-416, including images captured by the image sensor 404, calculated and/or stored poses, and/or identified and/or stored descriptor-based features. The mapping module 418 may be configured to associate calculated maps received from the tracking module 420 with stored maps received from the map database 424 so that the calculated maps may be associated with the stored maps in the coordinate world system. The associations may be used to update the stored maps by expanding, reducing, and/or changing the stored maps. The calculated maps that can be associated with the stored maps and the associations may be stored in the map database 424, and the calculated maps may be incorporated into the stored maps. Calculated maps that cannot be associated with stored maps may be stored without associations to the stored maps in the map database 424, and the calculated maps may be incorporated into the stored maps.

An initializing/reinitializing module 422 may be configured to initialize/reinitialize a pose and/or map for the robotic device. A detailed description of initialization may be found in International Patent Application No. PCT/CN2017/094926, entitled "Image Sensor Initialization in a Robotic device," which in incorporated herein in its entirety. Initializing and reinitializing a pose and/or a map are interchangeable processes. Initializing and reinitializing may differ in that initializing may occur in response to a start of a new tracking session for the robotic device, such as starting after completion of a prior tracking session and/or after booting and/or wakeup of the robotic device; and reinitializing may occur in response to interruption of a tracking session, such as after losing track due to receiving sensor data in an abnormal environment. Various embodiments herein may be described in terms of reinitializing without limiting the scope of the descriptions and claims, as the descriptions of the embodiments may also apply to initializing.

The reinitializing module 422 may reinitialize a pose and/or map for the robotic device in response to losing tracking by the tracking module 420. The reinitializing module 422 may receive sensor data from any number and combination of the sensors 404-416 and/or sensor array 402. The reinitializing module 422 may use multiple sets of sensor data to determine a pose and/or maps for the robotic device, which may be referred to as a reinitialized pose and a reinitialized map. The reinitializing module 422 may compare the multiple sets of sensor data to determine the reinitialized pose and/or the reinitialized map for the robotic device. For example, the sensors 404-416 may capture four sets of sensor data from four different orientations of the sensors 404-416 in an environment enclosed by four walls. By comparing the four sets of sensor data, the reinitializing module 422 may determine a reinitialized pose of the robotic device in the environment relative to the four walls. Further, the reinitializing module 422 may determine a reinitialized map for the robotic device in the directions the sensors 404-416 captured the four sets of sensor data.

The reinitializing module 422 may provide the reinitialized pose and/or the reinitialized map to the tracking module 420, and the tracking module 420 may restart and/or continue tracking for the robotic device from the reinitialized pose and/or the reinitialized map. In various embodiments, the mapping module 418 may receive the reinitialized map and/or calculated maps based on the reinitialized map, from the tracking module 420. The mapping module 418 may treat the reinitialized map and/or the calculated maps based on the reinitialized map, in the same manner as other calculated maps received from the tracking module 420. The mapping module 418 may associate the reinitialized map and/or calculated maps based on the reinitialized map with stored maps, and/or store the reinitialized map and/or calculated maps based on the reinitialized map in the map database 424.

A path planning module 428 may be configured to plan a path (i.e., generate a "planned path") of poses from stored maps to a next goal. In response to interruption of a tracking session, such as after the tracking module 420 losing track due to receiving sensor data in an abnormal environment, the path planning module 428 may determine a pose along the planned path to the next goal. For example, the pose may be the next closes pose in the stored maps from the last calculated pose of the robotic device. In various embodiments, the path planning module 428 may determine whether there is sufficient sensor data and/or descriptor-based feature data associated with the pose for a relocating module 426 to relocate the pose and/or map of the robotic device. In various embodiments, the path planning module 428 may determine sufficiency of the sensor data and/or descriptor-based feature data associated with the determined pose in terms of quantity and/or quality. The path planning module 428 may compare and indicator of the quantity and/or quality of the sensor data and/or descriptor-based feature data associated with the determined pose to a threshold for the quantity and/or quality of the sensor data and/or descriptor-based feature data. For the sensor data and/or descriptor-based feature data associated with the determined pose of sufficient quantity and/or quality, the processing device may provide maps associated with the determined pose to the relocating module 426.

The relocating module 426 may be configured to relocate a pose and/or map for the robotic device. Similar to the reinitializing module 422, the relocating module 426 may be trigger to relocate a pose and/or map for the robotic device in response to interruption of a tracking session, such as after the tracking module 420 losing track due to receiving sensor data in an abnormal environment. The relocating module 426 may receive any number of maps from the map database 424. In various embodiments, the relocating module 426 may receive maps from the map database 424 via the mapping module 418, the tracking module 420, and/or the path planning module 428. In various embodiments, the maps may be selected by any of the mapping module 418, the tracking module 420, and/or the relocating module 426 based on the calculated map and/or stored maps associated with the calculated map, such as stored maps having map data for a pose within a threshold distance from a calculated pose. In various embodiments, the maps may be selected by the path planning module 428 based on stored maps associated with a pose along a planned path to a next goal. The relocating module 426 may also receive sensor data from any number and combination of the sensors 404-416 and/or sensor array 402. In various embodiments, the relocating module 426 may receive the sensor data via the tracking module 420. The relocating module 426 may compare the received sensor data with sensor data of the received maps to determine whether the robotic device is at or near a pose of the received maps, which may be referred to as a relocated pose and relocated map. For example, the relocating module 426 may compare an image received from the image sensor 404 with an image of the sensor data of a received map to determine whether there are sufficient similarities between the images to determine that the robotic device is at or near a pose associated with the image or the sensor data of the received map. In various embodiments, the comparison of one type of sensor data, such as the image in the example, may be combined with comparisons of other sensor data and/or descriptor-based features for the sensor data. Comparisons of sensor data that result in a positive identification of a pose and/or map may produce a relocated pose and/or a relocated map.

The relocating module 426 may provide the relocated pose and/or the relocated map to the tracking module 420, and the tracking module 420 may restart and/or continue tracking for the robotic device from the relocated pose and/or the relocated map. In various embodiments, the mapping module 418 may receive the relocated map and/or calculated maps based on the relocated map, from the tracking module 420. The mapping module 418 may treat the relocated map and/or the calculated maps based on the relocated map, in the same manner as other calculated maps received from the tracking module 420. The mapping module 418 may associate the relocated map and/or calculated maps based on the relocated map with stored maps, and/or store the relocated map and/or calculated maps based on the relocated map in the map database 424.

In various embodiments, sensor data and map data may be stored and received in a manner in which the data may be shared among multiple modules 418, 420, 422, 426, and 428. Storing the sensor data and map data for shared access by the multiple modules 418, 420, 422, 426, and 428 may reduce memory requirements for storing and using the sensor data and map data. As discussed herein, various modules 418, 420, 422, 426, and 428 may receive sensor data from the sensors 404-416 and/or the sensor array 402 and map data from the map database 424 via other modules 418, 420, 422, 426, and 428. Storing the sensor data and map data for shared access enables the various modules 418, 420, 422, 426, and 428 to access and use the same captured and/or stored sensor data and calculated and/or stored map data. For example, the same sensor data and map data may be shared by the reinitializing module 422 and the relocating module 426 to reinitialize a pose and/or map for the robotic device and to relocate a pose and/or map for the robotic device, including during concurrent operation of the reinitializing module 422 and the relocating module 426.

Figure 5:
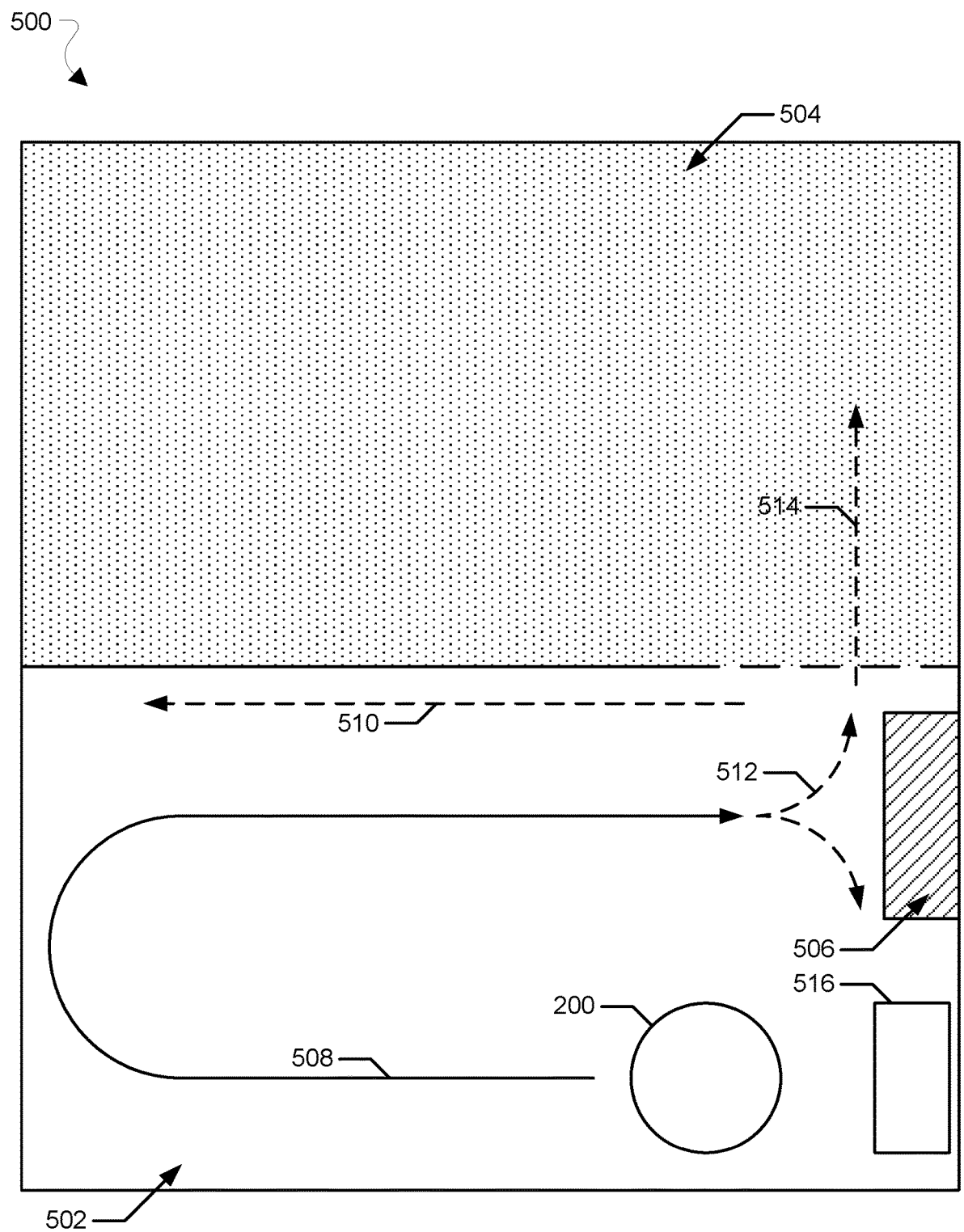
FIG. 5 illustrates environmental navigation by a robotic device according to various embodiments.

FIG. 5 illustrates an example environmental navigation by a robotic device according to various embodiments. With reference to FIGS. 1-5, a robotic device 200 may be placed in an environment 500 at a starting location 516. In various embodiments, the starting location 516 may be a charging station for the robotic device 200. In various embodiments, the robotic device 200 may be initially located in a known or mapped environment 502 of the environment 500. The known environment 502 may be known because the robotic device 200 may have stored maps for the known environment 502. In various embodiments, the stored maps for the known environment 502 may be preloaded to the robotic device 200 and/or the robotic device 200 may have mapped the known environment 502 by tracking its previous movements in the known environment 502.

In the example illustrated in FIG. 5, the robotic device 200 may travel approximately along a path 508 without losing tracking. The path 508 may be in a portion of the known environment 502 that is also a normal environment. In other words, the path 508 may be in a portion of the known environment 502 in which the robotic device 200 may travel without losing tracking because the robotic device 200 may correlate sensor data captured along the path 508 with sensor data of the stored maps for the known environment 502.

The robotic device 200 may travel to a location in the known environment 502 that is an abnormal environment 506. As the robotic device 200 approaches the abnormal environment 506, the robotic device 200 may not be able to identify sensor data captured along any path 512 with sensor data of the stored maps for the known environment 502. The captured sensor data for the abnormal environment 506 captured along any path 512 may be too poorly illuminated, lacking enough features, and/or unfamiliar due to lack of prior mapping and/or changes to the known environment 502. Due to the abnormal environment 506, the robotic device 200 may lose tracking along any path 512.

In various embodiments, the robotic device 200 may relocate within the known environment 502 by recognizing captured sensor data along the path 510. In various embodiments, the robotic device 200 may pre-relocate the robotic device 200 based on stored sensor data along the path 510, and the robotic device 200 may relocate using the captured sensor data along the path 510. The robotic device 200 may produce a relocated pose and/or a relocated map and travel along the path 510.

In various embodiments, the robotic device 200 may capture sensor data along a path 514 in an unknown environment 504. The robotic device 200 may not be able to relocate in the unknown environment 504 because the robotic device 200 may not have stored maps for the unknown environment 504. The robotic device 200 may be able to capture sensor data along the path 514 sufficient to determine a pose and/or a map for the robotic device 200 in unknown environment 504, and to produce a reinitialized pose and/or a reinitialized map for the robotic device 200 in unknown environment 504. In various embodiments, the robotic device 200 may eventually return to the known environment 502 without losing tracking and correlate the reinitialized map for the unknown environment 504 with the stored maps for the known environment 502. Upon the association and saving the reinitialized map for the unknown environment 504, the mapped portion of the unknown environment 504 may be converted part of to the known environment 502. In various embodiments, the robotic device 200 may also reinitialize in the known environment 502 by capturing sensor data along the path 510 sufficient to determine a pose and/or a map for the robotic device 200 in known environment 502, and to produce a reinitialized pose and/or a reinitialized map for the robotic device 200 in known environment 502.

In various embodiments, whether the robotic device 200 relocates and follows the path 510 or reinitializes and follows the path 514 may depend on which process, relocation or reinitialization, completes quicker. In various embodiments, whether the robotic device 200 relocates and follows the path 510 or reinitializes and follows the path 514 may depend on whether the robotic device 200 pre-relocates and then relocates, or cannot pre-relocate and then reinitializes.

Figure 6:
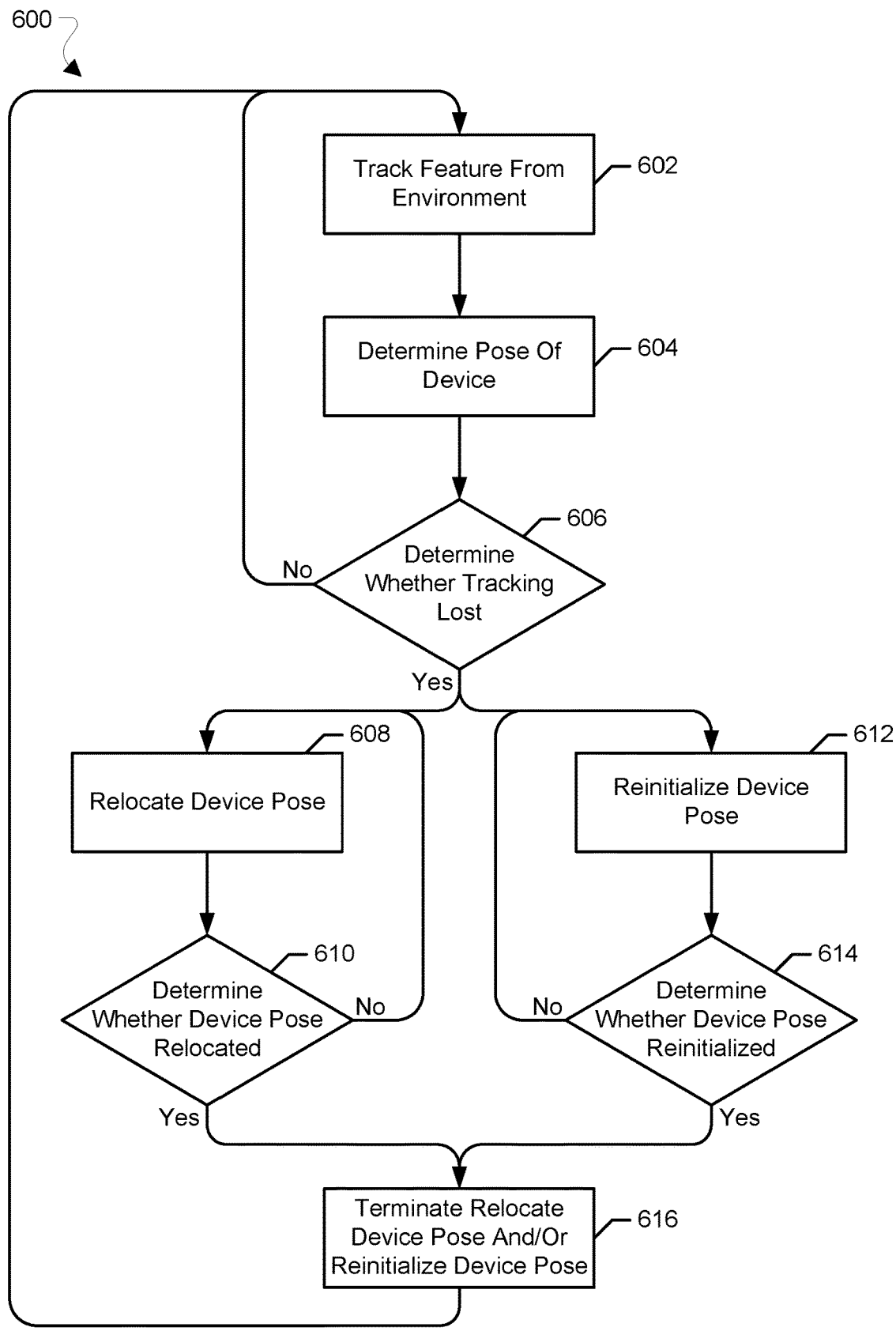
FIG. 6 is a process flow diagram illustrating a method of concurrent relocation and reinitialization for a robotic device according to various embodiments.

FIG. 6 illustrates a method 600 of comment relocation and reinitialization for a robotic device according to various embodiments. With reference to FIGS. 1-6, a processor of a robotic device (e.g., the processor 220, the processing device 310, the SoC 312, and/or the like and hardware components and/or software components (e.g., hardware and/or software modules 420-428)) of the robotic device may concurrently attempt relocation and reinitialization for a robotic device (e.g., any component of the robotic device including the robotic device itself) using any number and combination of sensors (e.g., sensors 404-416) of the robotic device.

In block 602, the processor may track a feature from an environment. The environment may be an environment in which the robotic device is located. Tracking the feature from the environment may include capturing sensor data of the feature via any number and combination of the sensors. For example, capturing an image of the feature using an image sensor.

In block 604, the processor may determine a pose of the robotic device. The pose may be determined by comparing the captured sensor data to stored sensor data of a stored map. In response to determining a match between the captured sensor data and the stored sensor data of a stored map, the processor may identify a pose associated with the stored sensor data of the stored map and determine the pose to be the pose of the robotic device. In response not finding a match between the captured sensor data and the stored sensor data of a stored map, the processor may not determine a pose for the robotic device. In various embodiments, the processes of determining a pose of the robotic device may end once a pose is determined and/or once a pose determination threshold is exceeded without determining a pose of the robotic device. In various embodiments, the pose threshold may be expressed in terms of amount of stored sensor data of stored maps compared, a time, etc.

In determination block 606, the processor may determine whether tracking is lost for the robotic device. In response to determining a pose for the robotic device, the processor may determine that the processor has not lost tracking for the robotic device. In response to not determining a pose for the robotic device, the processor may determine that the processor has lost tracking for the robotic device.

In response to determining that tracking is lost for the robotic device (i.e., determination block 606="Yes"), the processor may concurrently relocate a robotic device pose in block 608 and reinitialize a robotic device pose in block 612. In various embodiments, relocating a robotic device pose in block 608 is described further herein with reference to the method 800 illustrated in FIG. 8, and reinitializing a robotic device pose in block 612 is described further herein with reference to the method 900 illustrated in FIG. 9.

In determination block 610, the processor may determine whether a robotic device pose is relocated. In various embodiments, the processor may determine whether the robotic device pose is relocated in response to receiving an indication that the robotic device pose relocation is successful as described with reference to block 818 of the method 800 illustrated in FIG. 8, or receiving an indication that the robotic device pose relocation is unsuccessful as described with reference to block 820 of the method 800 illustrated in FIG. 8.

In determination block 614, the processor may determine whether a robotic device pose is reinitialized. In various embodiments, the processor may determine whether the robotic device pose is reinitialized in response to receiving an indication that the robotic device pose reinitialization is successful as described with reference to block 914 of the method 900 illustrated in FIG. 9, or receiving an indication that the robotic device pose reinitialization is unsuccessful as described with reference to block 916 of the method 900 illustrated in FIG. 9.

In various embodiments, determining whether a robotic device pose is relocated in determination block 610 and determining whether a robotic device pose is reinitialized in determination block 614 may be implemented by the processor concurrently. Whether determining whether a robotic device pose is relocated in determination block 610 and determining whether a robotic device pose is reinitialized in determination block 614 are implemented concurrently may depend on when relocating a robotic device pose in block 608 and reinitializing a robotic device pose in block 612 each complete executing.

In response to determining that a robotic device pose is not relocated (i.e., determination block 610="No"), the processor may relocate a robotic device pose in block 608.

In response to determining that a robotic device pose is not reinitialized (i.e., determination block 614="No"), the processor may reinitialize a robotic device pose in block 612.

In response to determining that a robotic device pose is relocated (i.e., determination block 610="Yes"), or in response to determining that a robotic device pose is reinitialized (i.e., determination block 614="Yes"), the processor may terminate relocating a robotic device pose (as implemented in block 608) and/or reinitializing a robotic device pose (as implemented in block 612) in block 616. In various embodiments, it may only be one of relocating a robotic device pose in block 608 and reinitializing a robotic device pose in block 612 that may need to be terminated. For example, in response to determining that a robotic device pose is relocated (i.e., determination block 610="Yes"), the processor may terminate reinitializing a robotic device pose (as implemented in block 612) in block 616, For further example, in response to determining that a robotic device pose is reinitialized (i.e., determination block 614="Yes"), the processor may terminate relocating a robotic device pose (as implemented in block 608) in block 616.

Figure 7:
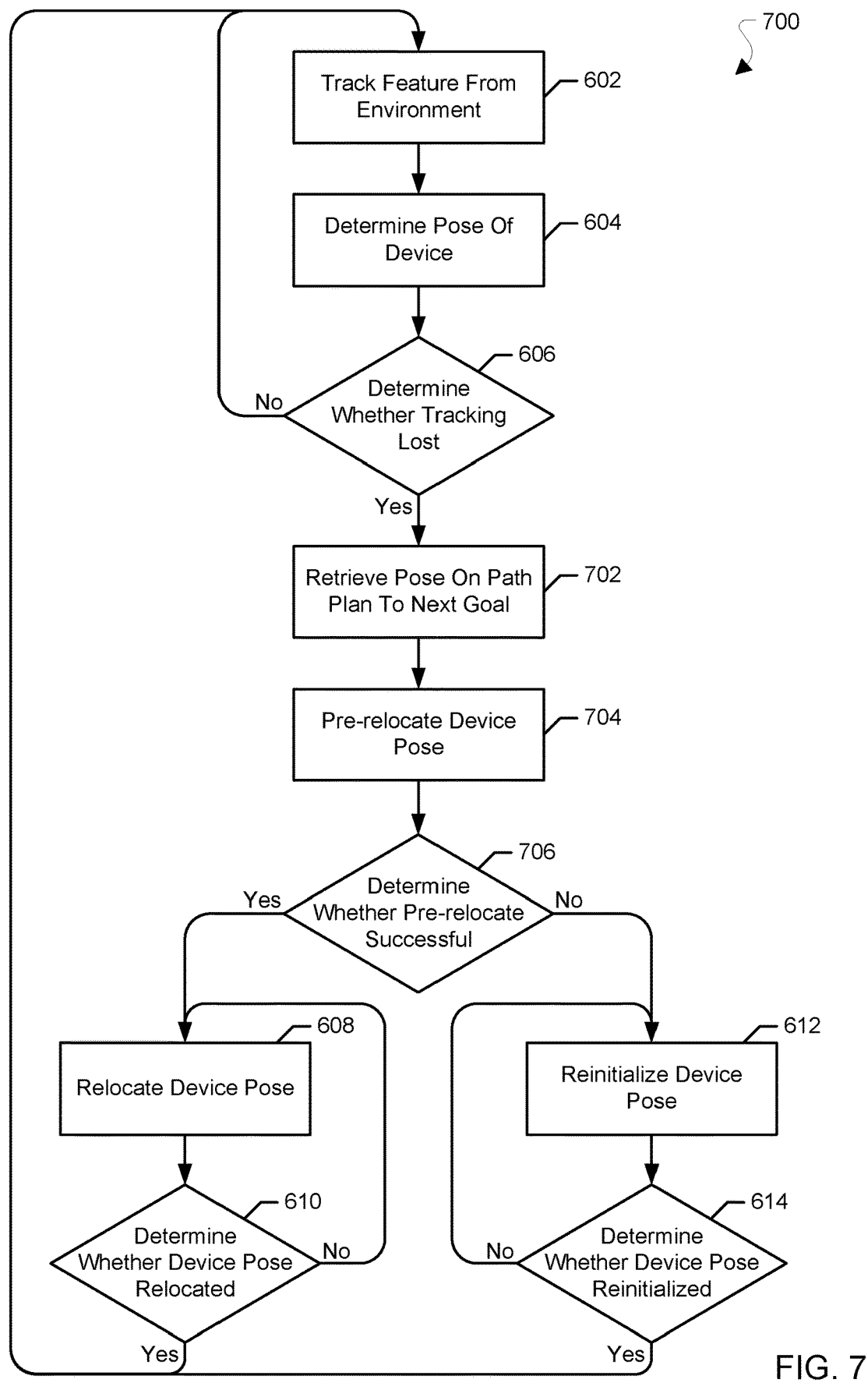
FIG. 7 is a process flow diagram illustrating a method of relocation and reinitialization with pre-relocation for a robotic device according to various embodiments.

In response to determining that tracking is not lost for the robotic device (i.e., determination block 606="No"), or after and/or concurrent with termination terminating relocating a robotic device pose (as implemented in block 608) and/or reinitializing a robotic device pose (as implemented in block 612) in block 616, the processor may track a feature from the environment in block 602, FIG. 7 illustrates a method 700 of relocation and reinitialization with pre-relocation for a robotic device according to various embodiments, With reference to FIGS. 1-7, a processor of a robotic device (e.g., the processor 220, the processing device 310, the SoC 312, and/or the like and hardware components and/or software components (e.g., hardware and/or software modules 420-428)) of the robotic device may attempt relocation or reinitialization for a robotic device (e.g., any component of the robotic device including the robotic device itself) using any number and combination of sensors (e.g., sensors 404-416) of the robotic device, based on a determination of pre-relocation for the robotic device.

In various embodiments, the processor may implement blocks 602, 604, 606, 608, 610, 612, and 614 of the method 600 as described.

In block 602, the processor may track a feature from an environment. The environment may be an environment in which the robotic device is located. In block 604, the processor may determine a pose of the robotic device. In determination block 606, the processor may determine whether tracking is lost for the robotic device.

In response to determining that tracking is lost for the robotic device (i.e., determination block 606="Yes"), the processor may retrieve a pose on a path that is planned to reach a next goal in block 702. In various embodiments, the processor may select a pose on the path plan based on a next pose on the planned path not yet achieved by the robotic device. In various embodiments, the processor may select a pose on the planned path based on a closest pose on the planned path to a last pose of the robotic device, regardless of whether the closest pose has already been achieved by the robotic device. In various embodiments, the processor may select a pose on the planned path based on a quantity and/or quality of map data associated with the pose, regardless of whether the pose has already been achieved by the robotic device. In various embodiments, the processor may select a pose on the planned path based on a number of criteria that may each be weighted based on a priority of each criterion.

In block 704, the processor may pre-relocate a robotic device pose. In various embodiments, pre-relocating a robotic device pose in block 704 is described further herein with reference to the method 1000 illustrated in FIG. 10.

In determination block 706, the processor may determine whether a robotic device pose is pre-relocated. In various embodiments, the processor may determine whether the robotic device pose is pre-relocated in response to receiving an indication that the robotic device pose pre-relocation is successful as described with reference to block 1014 of the method 1000 illustrated in FIG. 10, or receiving an indication that the robotic device pose pre-relocation is unsuccessful as described with reference to block 1016 of the method 1000 illustrated in FIG. 10.

In response to determining that a robotic device pose is pre-relocated (i.e., determination block 706="Yes"), the processor may relocate a robotic device pose in block 608. In various embodiments, relocating a robotic device pose in block 608 is described further herein with reference to the method 800 illustrated in FIG. 8 and/or is described further herein with reference to the method 1100 illustrated in FIG. 11.

In response to determining that a robotic device pose is not pre-relocated (i.e., determination block 706="No"), the processor may reinitialize a robotic device pose in block 612.

In various embodiments, relocating a robotic device pose in block 608 and reinitializing a robotic device pose in block 612 may not be implemented concurrently in the method 700.

In response to determining that a robotic device pose is relocated (i.e., determination block 610="Yes"), or in response to determining that a robotic device pose is reinitialized (i.e., determination block 614="Yes"), the processor may track a feature from the environment in block 602.

Figure 8:
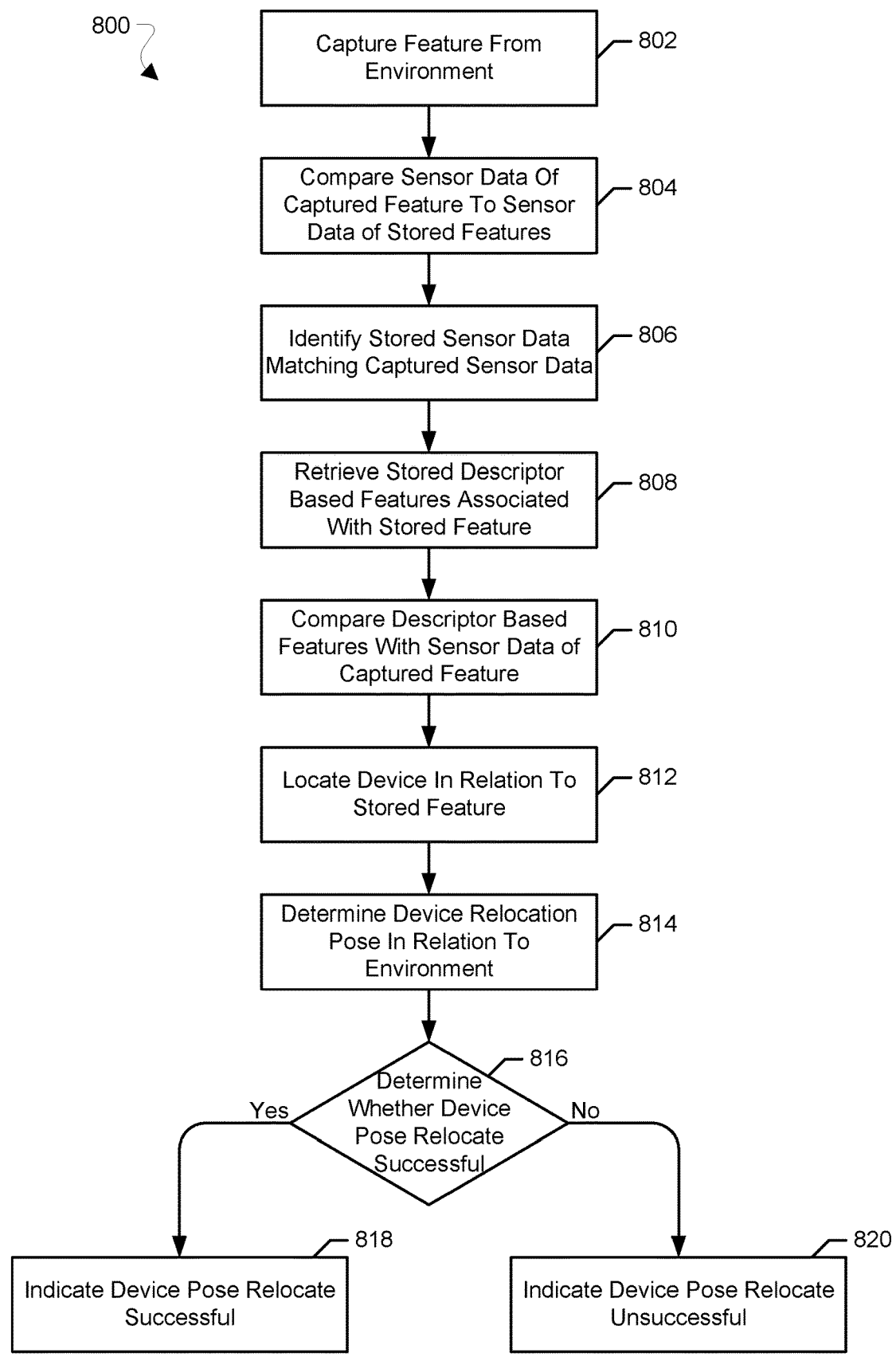
FIG. 8 is a process flow diagram illustrating a method of relocation for a robotic device according to various embodiments.

FIG. 8 illustrates a method 800 of relocation for a robotic device according to various embodiments. With reference to FIGS. 1-8, a processor of a robotic device (e.g., the processor 220, the processing device 310, the SoC 312, and/or the like and hardware components and/or software components (e.g., hardware and/or software modules 420-428)) of the robotic device may attempt relocation for a robotic device (e.g., any component of the robotic device including the robotic device itself) using any number and combination of sensors (e.g., sensors 404-416) of the robotic device.

In block 802, the processor may capture a feature from an environment. Capturing a feature from the environment may include capturing sensor data for the feature from any number and combination of sensors. For example, capturing an image of the feature using an image sensor. In various embodiments, the feature may be a different feature from the hacked feature, as described with reference to block 602 of the method 600, that caused the processor to lose tracking for the robotic device.

In block 804, the processor may compare sensor data of the captured feature to stored sensor data of features. For example, the processor may compare an image capture of the feature with stored image captures of features. The processor may compare the sensor data of the captured feature to sensor data of any number of stored features. In various embodiments, the stored sensor data compared to the captured sensor data may be limited by any number of criteria, such as an associated pose of the stored sensor data no more than a maximum distance from a last pose of the robotic device.

In block 806, the processor may identify a stored feature with sensor data matching the sensor data of the captured feature. For example, the processor may identify a stored image of a stored feature matching a captured image of the captured feature. In various embodiments, the processor may determine a match based on any of or combination of a minimum number of match points of the stored sensor data and the captured sensor data and/or a minimum quality indicator of a match point of the stored sensor data and the captured sensor data.

In block 808, the processor may retrieve stored descriptor-based features associated with the stored feature. The stored descriptor-based features may be included in the map data of a map with which the stored feature is associated. The descriptor-based features may be features of the stored sensor data that may be used to identify a feature of the environment. For example, a particular pattern of sensor data may indicate a corner feature. Descriptor-based features may also indicate locations of a feature in a multidimensional space, such as a height from a reference point; an orientation of a feature in the environment; and/or other sensor data that may not be indicative of a specific feature but that is otherwise noteworthy.

In block 810, the processor may compare the descriptor-based features associated with the stored feature with the sensor data of the captured feature. In comparing the descriptor-based features with the sensor data, the processor may identify a pattern of sensor data matching a pattern of sensor data associated with a descriptor-based feature, and identify the pattern of sensor data as indicating the descriptor-based feature. Positive comparisons of the descriptor-based features with the sensor data may allow the processor to identify the captured feature as the stored feature.

In block 812, the processor may locate the robotic device in relation to a pose associated with the stored feature. The stored feature and pose may be associated map data of a stored map. The processor may calculate a location of the robotic device using any combination of a previous pose of the robotic device, captured sensor data since the previous pose of the robotic device that may be used to indicate distance and direction of movement of the robotic device, and the pose of the stored feature.

In block 814, the processor may determine a robotic device pose in relation to the environment. The processor may use the location of the robotic device in relation to the stored feature to determine a pose of the robotic device on the map associated with the stored feature. The processor may determine the robotic device pose on the map based on where the map is in the coordinate world system, where the stored feature is in relation to the map, and where the robotic device is in relation to the stored feature. The processor may further use the location of the map in the coordinate world system to provide a relative location to any number of other maps of the environment in the coordinate world system. The processor may use the location of the robotic device in relation to the map to determine a robotic device pose in the maps that make up the environment in the coordinate world system.

In determination block 816, the processor may determine whether robotic device pose relocation is successful. The processor may determine that robotic device pose relocation is successful in response to determining the device pose in relation to the environment in block 814. The processor may determine that robotic device pose relocation is unsuccessful in response to failure to determine the device pose in relation to the environment in block 814.

In response to determining that robotic device pose relocation is successful (i.e., determination block 816="Yes"), the processor may indicate that robotic device pose relocation is successful in block 818. The processor may indicate that robotic device pose relocation is successful by sending a signal indicating that robotic device pose relocation is successful, setting a register flag or bit indicating that the that robotic device pose relocation is successful, and/or returning the robotic device relocation pose.

In response to determining that robotic device pose relocation is not successful (i.e., determination block 816="No"), the processor may indicate that robotic device pose relocation is unsuccessful in block 820. The processor may indicate that robotic device pose relocation is unsuccessful by sending a signal indicating that robotic device pose relocation is unsuccessful and/or setting a register flag or bit indicating that the that robotic device pose relocation is unsuccessful.

Figure 9:
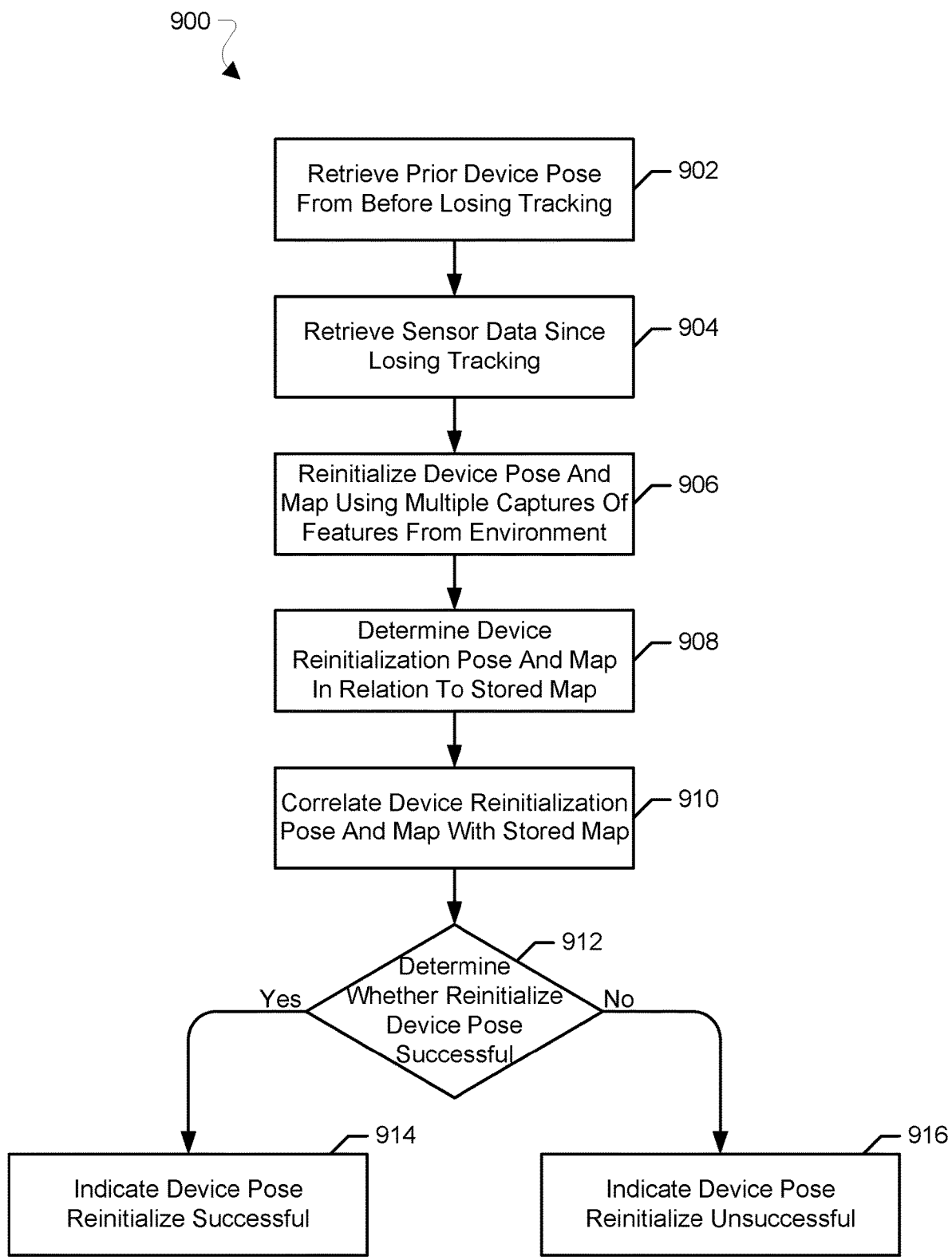
FIG. 9 is a process flow diagram illustrating a method of reinitialization with for a robotic device according to various embodiments.

FIG. 9 illustrates a method 900 of reinitialization with for a robotic device according to various embodiments. With reference to FIGS. 1-9, a processor of a robotic device (e.g., the processor 220, the processing device 310, the SoC 312, and/or the like and hardware components and/or software components (e.g., hardware and/or software modules 420-428)) of the robotic device may attempt reinitialization for a robotic device (e.g., any component of the robotic device including the robotic device itself) using any number and combination of sensors (e.g., sensors 404-416) of the robotic device.

In block 902, the processor may retrieve a prior robotic device pose from before losing tracking. The processor may access a temporary memory, such as a cache and/or a register that may store a designated number of poses of the robotic device. In various embodiments, the poses in the temporary memory may be replaced based by a more recent robotic device pose based on a replacement policy, such as first in first out. The processor may retrieve any number and combination of prior robotic device poses from the temporary memory.

In block 904, the processor may retrieve sensor data since losing tracking. The processor may access a temporary memory, such as a cache and/or a register that may store a designated amount of sensor data for the robotic device. In various embodiments, the sensor data in the temporary memory may be replaced based by a more recent sensor data based on a replacement policy, such as first in first out. The processor may retrieve any amount and combination of sensor data from the temporary memory.

In block 906, the processor may reinitialize a pose and map for the robotic device using captured sensor data of multiple features of the environment. As noted herein, regionalization and initialization are similar processes to the process of initialization as described in International Patent Application No. PCT/CN2017/094926, entitled "Image Sensor Initialization in a Robotic device," which in incorporated herein in its entirety. The processor may determine a location and an orientation of the robotic device in relation to the multiple captured features in the environment and a map of the environment based on the robotic device's relationship to the multiple captured features. The processor may use the location and orientation of the robotic device in relation to the multiple captured features as a robotic device reinitialization pose within a reinitialization map that includes the map based on the relation of the robotic device to the multiple captured features.

In block 908, the processor may determine the robotic device reinitialization pose and reinitialization map in relation to stored maps. As the robotic device moves from its robotic device reinitialization pose, the processor may determine the robotic device pose from known, stored maps. The processor may use sensor data from movements from the robotic device reinitialization pose to determine relationships between the robotic device reinitialization pose and the robotic device pose on a stored map. For example, the sensor data may indicate movement distance and direction between the robotic device reinitialization pose and the robotic device pose on a stored map. The processor may calculate relationships, such as distance and angle or direction between the robotic device reinitialization pose and the robotic device pose on a stored map. Similarly, the processor may orient the reinitialization map with the stored map based on the robotic device reinitialization pose and the robotic device pose on the stored map, and/or how the sensor data indicates the robotic device moves through the reinitialization map and the stored map.

In block 910, the processor may correlate the robotic device reinitialization pose and reinitialization map with the stored map. From the determination of the relations between the robotic device reinitialization pose and reinitialization map with the stored map in block 908, the processor may correlate the correlate the robotic device reinitialization pose and reinitialization map with the stored map so that the device reinitialization pose and reinitialization map may be integrated into the coordinate world system. The processor may convert the sensor data and/or relations between the robotic device reinitialization pose and reinitialization map with the stored map into units and locations within the coordinate world system based on the location of the stored map in the coordinate world system.

In determination block 912, the processor may determine whether robotic device pose reinitialization is successful. The processor may determine that robotic device pose reinitialization is successful in response to correlating the robotic device reinitialization pose and reinitialization map with the stored map in block 910. The processor may determine that robotic device pose reinitialization is unsuccessful in response to failure to correlate the robotic device reinitialization pose and reinitialization map with the stored map in block 910.

In response to determining that robotic device pose reinitialization is successful (i.e., determination block 912="Yes"), the processor may indicate that robotic device pose reinitialization is successful in block 914. The processor may indicate that robotic device pose reinitialization is successful by sending a signal indicating that robotic device pose reinitialization is successful, setting a register flag or bit indicating that the that robotic device pose reinitialization is successful, and/or returning the robotic device reinitialization pose.

In response to determining that robotic device pose reinitialization is not successful (i.e., determination block 912="No"), the processor may indicate that robotic device pose reinitialization is unsuccessful in block 916. The processor may indicate that robotic device pose reinitialization is unsuccessful by sending a signal indicating that robotic device pose reinitialization is unsuccessful and/or setting a register flag or bit indicating that the that robotic device pose reinitialization is unsuccessful.

Figure 10:
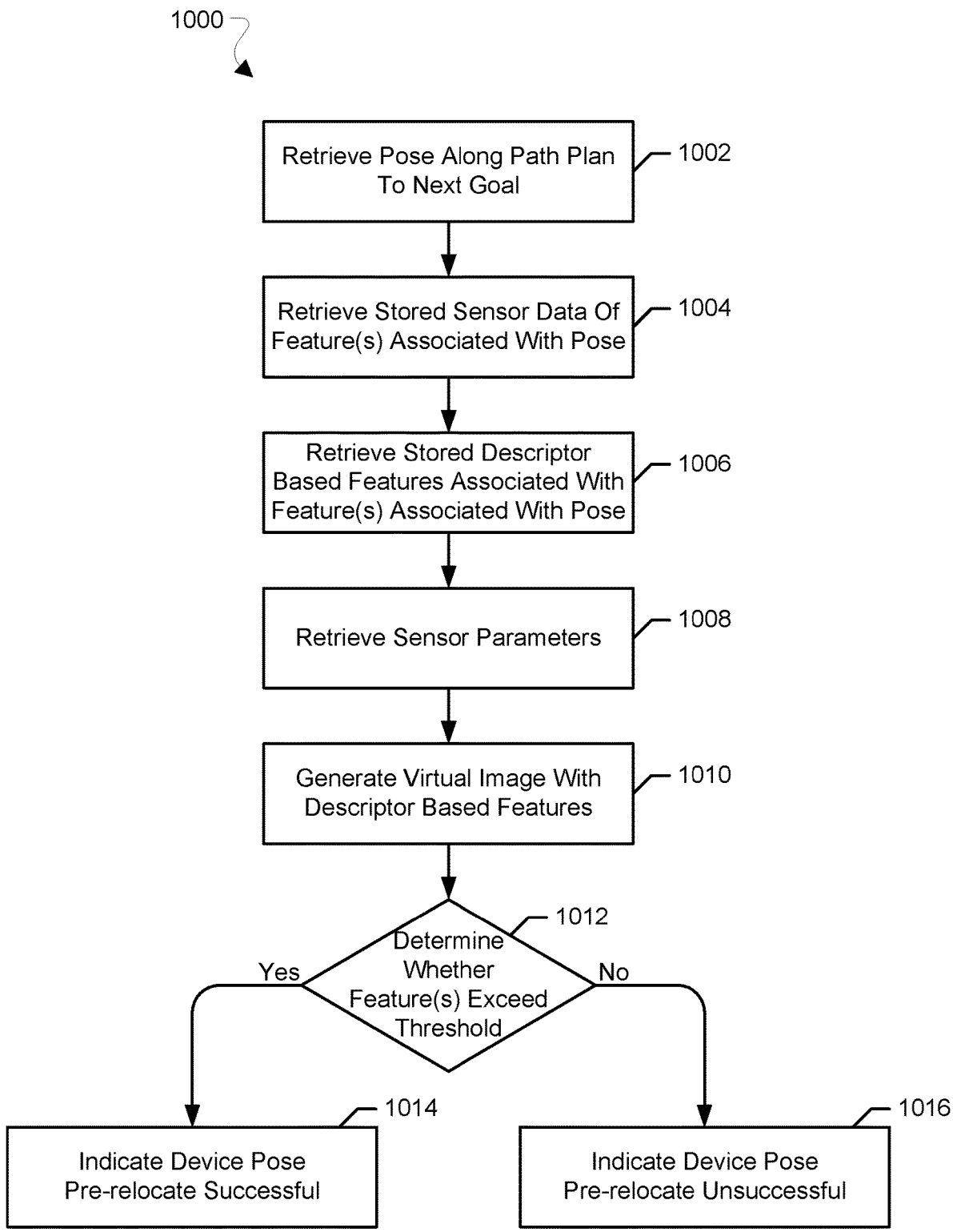
FIG. 10 is a process flow diagram illustrating a method of pre-relocation for a robotic device according to various embodiments.

FIG. 10 illustrates a method 1000 of pre-relocation for a robotic device according to various embodiments. With reference to FIGS. 1-10, a processor of a robotic device (e.g., the processor 220, the processing device 310, the SoC 312, and/or the like and hardware components and/or software components (e.g., hardware and/or software modules 420-428)) of the robotic device may attempt pre-relocation for a robotic device (e.g., any component of the robotic device including the robotic device itself) using any number and combination of sensors (e.g., sensors 404-416) of the robotic device.

In block 1002, the processor may retrieve a pose along a planned path to a next goal. In various embodiments, the processor may select a pose on the planned path based on a next pose on the planned path not yet achieved by the robotic device. In various embodiments, the processor may select a pose on the planned path based on a closest pose on the planned path to a last pose of the robotic device, regardless of whether the closest pose has already been achieved by the robotic device. In various embodiments, the processor may select a pose on the planned path based on a quantity and/or quality of map data associated with the pose, regardless of whether the pose has already been achieved by the robotic device. In various embodiments, the processor may select a pose on the planned path based on a number of criteria that may each be weighted based on a priority of each criterion.

In block 1004, the processor may retrieve stored sensor data of any number and combination of stored features associated with the pose on the path plan. For example, the processor may retrieve an image capture of a stored feature associated with the pose on the path plan.

In block 1006, the processor may retrieve stored descriptor-based features associated with the stored features associated with the pose on the path plan. The stored descriptor-based features may be included in the map data of a map with which the stored feature and pose on the planned path are associated. The descriptor-based features may be features of the stored sensor data that may be used to identify a feature of the environment. For example, a particular pattern of sensor data may indicate a corner feature. Descriptor-based features may also indicate locations of a feature in a multidimensional space, such as a height from a reference point; an orientation of a feature in the environment; and/or other sensor data that may not be indicative of a specific feature but that is otherwise noteworthy.

In block 1008, the processor may retrieve sensor parameters. In various embodiments, the sensors may have extrinsic and/or intrinsic parameters. For example, extrinsic parameters of the sensor may include parameters that are not technical parameters of the sensor, such as placement of the sensor on the robotic device. An example may include a relative position between the location of the sensor on the robotic device and the location of a pose for the robotic device. Intrinsic parameters may include technical parameters of the sensors, such as focal length, principal point, spectrum sensitivity, etc.

In block 1010, the processor may generate a virtual image of the pose on the planned path with the descriptor-based features. A virtual image may be a recreation of the conditions under which the sensor data for the feature associated with the pose on the planned path were captured. For example, as noted herein, a pose may be for component of the robotic device and/or a point of the robotic device itself. In various embodiments, the pose may be a pose of a sensor, such as an image sensor, of the robotic device. The pose may be calculated using a given pose if the robotic device and extrinsic parameters of the sensor, such as relative positions between the location of the sensor on the robotic device and the pose or the robotic device. Using such information, the pose for the sensor when the sensor data for the feature may be determined for when the sensor data were captured for the feature associated with the pose on the planned path were captured.

In determination block 1012, the processor may determine whether the descriptor-based features of the feature associated with the pose on the planned path exceed a feature threshold. The processor may compare and indicator of the quantity and/or quality of the descriptor-based feature data of the feature associated with the pose on the planned path to a feature threshold for the quantity and/or quality of the descriptor-based feature data. For the descriptor-based feature data associated of sufficient quantity and/or quality, the processor may determine that the descriptor-based features of the feature associated with the pose on the planned path exceed the feature threshold.

In response to determining that the descriptor-based features of the feature associated with the pose on the planned path exceed the feature threshold (i.e., determination block 1012="Yes"), the processor may indicate that the robotic device pose pre-relocation is successful in block 1014. The processor may indicate that robotic device pose pre-relocation is successful by sending a signal indicating that robotic device pose pre-relocation is successful, setting a register flag or bit indicating that the that robotic device pose pre-relocation is successful, and/or returning the robotic device pre-relocation pose.

Figure 11:
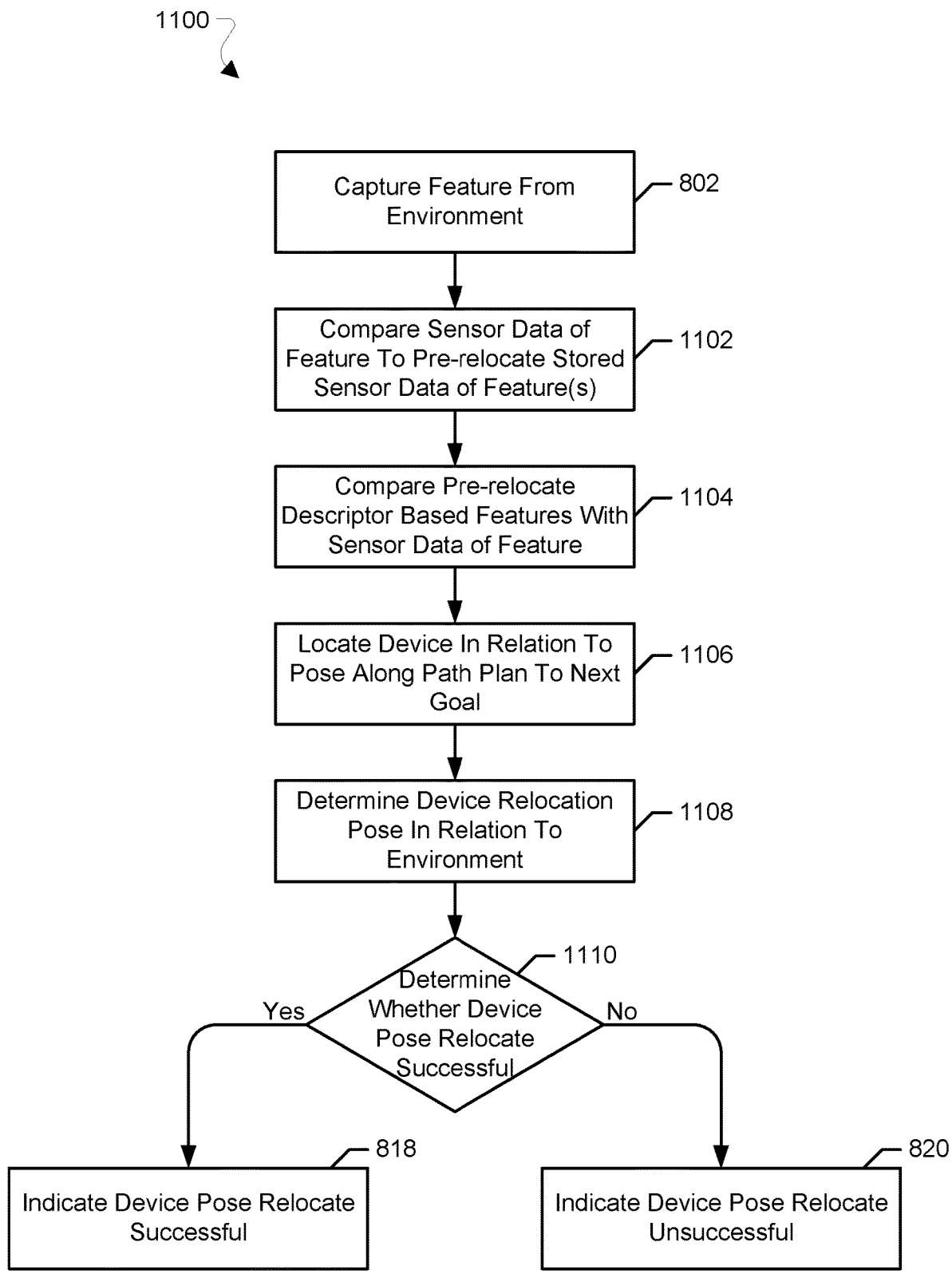
FIG. 11 is a process flow diagram illustrating a method of relocation with pre-relocation for a robotic device according to various embodiments.

In response to determining that the descriptor-based features of the feature associated with the pose on the planned path does not exceed the feature threshold (i.e., determination block 1012="No"), the processor may indicate that the robotic device pose pre-relocation is unsuccessful in block 1016. The processor may indicate that robotic device pose pre-relocation is unsuccessful by sending a signal indicating that robotic device pose pre-relocation is unsuccessful and/or setting a register flag or bit indicating that the that robotic device pose pre-relocation is unsuccessful, FIG. 11 illustrates a method 1100 of relocation with pre-relocation for a robotic device according to various embodiments. With reference to FIGS. 1-11, a processor of a robotic device (e.g., the processor 220, the processing device 310, the SoC 312, and/or the like and hardware components and/or software components (e.g., hardware and/or software modules 420-428)) of the robotic device may attempt relocation with pre-relocation for a robotic device (e.g., any component of the robotic device including the robotic device itself using any number and combination of sensors (e.g., sensors 404-416) of the robotic device.

In various embodiments, the processor may implement blocks 802, 818, and 820 as described herein with reference to the method 800 illustrated in FIG. 8.

In block 802, the processor may capture a feature from an environment.

In block 1102, the processor may compare sensor data of the captured feature to stored sensor data of pre-locate features. The pre-locate features may include stored features associated with the pose on the planned path. For example, the processor may compare an image capture of the feature with stored image captures of features. The processor may compare the sensor data of the captured feature to sensor data of any number of pre-locate features. In various embodiments, the stored sensor data compared to the captured sensor data may be limited by any number of criteria, such as an associated pose of the stored sensor data no more than a maximum distance from a last pose of the robotic device and/or the pose on the planned path.

In block 1104, the processor may compare the descriptor-based features associated with the pre-locate feature with the sensor data of the captured feature. In comparing the descriptor-based features with the sensor data, the processor may identify a pattern of sensor data matching a pattern of sensor data associated with a descriptor-based feature, and identify the pattern of sensor data as indicating the descriptor-based feature. Positive comparisons of the descriptor-based features with the sensor data may allow the processor to identify the captured feature as the pre-locate feature.

In block 1106, the processor may locate the robotic device in relation to the pose on the planned path to the next goal. The pre-locate feature and pose on the planned path may be associated map data of a stored map. The processor may calculate a location of the robotic device using any combination of a previous pose of the robotic device, captured sensor data since the previous pose of the robotic device that may be used to indicate distance and direction of movement of the robotic device, and the pose of the pre-locate feature.

In block 1108, the processor may determine a robotic device pose in relation to the environment. The processor may use the location of the robotic device in relation to the pose on the planned path to determine a pose of the robotic device on the map associated with the pose on the path plan. The processor may determine the robotic device pose on the map based on where the map is in the coordinate world system, where the pose on the planned path is in relation to the map, and where the robotic device is in relation to the pose on the planned path. The processor may further use the location of the map in the coordinate world system to provide a relative location to any number of other maps of the environment in the coordinate world system. The processor may use the location of the robotic device in relation to the map to determine a robotic device pose in the maps that make up the environment in the coordinate world system.

In determination block 1110, the processor may determine whether robotic device pose relocation is successful. The processor may determine that robotic device pose relocation is successful in response to determining the device pose in relation to the environment in block 1108. The processor may determine that robotic device pose relocation is unsuccessful in response to failure to determine the device pose in relation to the environment in block 1108.

In response to determining that robotic device pose relocation is successful (i.e., determination block 1110="Yes"), the processor may indicate that robotic device pose relocation is successful in block 818.

In response to determining that robotic device pose relocation is not successful (i.e., determination block 1110="No"), the processor may indicate that robotic device pose relocation is unsuccessful in block 820.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 600, 700, 800, 900, 1000, and 1100 may be substituted for or combined with one or more operations of the methods 600, 700, 800, 900, 1000, and 1100 and vice versa.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method of relocation and reinitialization of a robotic device, comprising:
   determining a pose of the robotic device in an environment;
   determining whether tracking of the robotic device is lost; and
   simultaneously relocating to determine a relocated pose of the robotic device and reinitializing to determine a reinitialized pose of the robotic device in response to failing to determine the pose of the robotic device in the environment and determining that tracking of the robotic device is lost.

2. The method of claim 1, further comprising:
   determining whether relocating to determine the relocated pose of the robotic device is successful;
   terminating reinitializing to determine the reinitialized pose of the robotic device in response to determining that relocating to determine the relocated pose of the robotic device is successful;
   determining whether reinitializing to determine the reinitialized pose of the robotic device is successful; and
   terminating relocating to determine the relocated pose of the robotic device in response to determining that reinitializing to determine the reinitialized pose of the robotic device is successful.

3. The method of claim 1, further comprising:
   determining whether relocating to determine the relocated pose of the robotic device is successful;

relocating to determine the relocated pose of the robotic device in response to determining that relocating to determine the relocated pose of the robotic device is unsuccessful;

determining whether reinitializing to determine the reinitialized pose of the robotic device is successful; and reinitializing to determine the reinitialized pose of the robotic device in response to determining that reinitializing to determine the reinitialized pose of the robotic device is unsuccessful.

4. The method of claim 1, wherein relocating to determine the relocated pose of the robotic device comprises:

capturing sensor data of a first feature of the environment;

comparing the captured sensor data with stored sensor data for a plurality of features of the environment;

identify a second feature of the environment from the plurality of features of the environment having stored sensor data matching the captured sensor data;

locating the first feature of the environment in relation to the second feature of the environment;

determining the relocated pose of the robotic device in relation to the environment; and tracking the robotic device based on the relocated pose of the robotic device.

5. The method of claim 4, further comprising;

retrieving stored descriptor-based features of the second feature of the environment; and comparing the stored descriptor-based features of the second feature of the environment with the captured sensor data, wherein locating the first feature of the environment in relation to the second feature of the environment comprises locating the first feature of the environment in relation to the second feature of the environment based on comparing the stored descriptor-based features of the second feature of the environment with the captured sensor data.

6. The method of claim 1, wherein reinitializing to determine the reinitialized pose of the robotic device comprises:

retrieving a pose of the robotic device that was obtained before tracking of the robotic device was lost;

retrieving sensor data captured since tracking of the robotic device was lost; and reinitializing to determine the reinitialized pose of the robotic device using the pose of the robotic device that was obtained before tracking of the robotic device was lost and the sensor data captured since tracking of the robotic device was lost.

7. The method of claim 6, further comprising:

determining the reinitialized pose of the robotic device in relation to the environment; and correlating the reinitialized pose of the robotic device with a stored map of the environment.

8. A robotic device, comprising:

a memory;

a sensor; and a processor communicatively connected to the memory and the sensor, and configured with processor-executable instructions to:

determine a pose of the robotic device in an environment;

determine whether tracking of the robotic device is lost; and simultaneously relocate to determine a relocated pose of the robotic device and reinitialize to determine a reinitialized pose of the robotic device in response to failing to determine the pose of the robotic device in the environment and determining that tracking of the robotic device is lost.

9. The robotic device of claim 8, wherein the processor is further configured with processor-executable instructions to:

determine whether relocating to determine the relocated pose of the robotic device is successful;

terminate reinitializing to determine the reinitialized pose of the robotic device in response to determining that relocating to determine the relocated pose of the robotic device is successful;

determine whether reinitializing to determine the reinitialized pose of the robotic device is successful; and terminate relocating to determine the relocated pose of the robotic device in response to determining that reinitializing to determine the reinitialized pose of the robotic device is successful.

10. The robotic device of claim 8, wherein the processor is further configured with processor-executable instructions to:

determine whether relocating to determine the relocated pose of the robotic device is successful;

relocate to determine the relocated pose of the robotic device in response to determining that relocating to determine the relocated pose of the robotic device is unsuccessful;

determine whether reinitializing to determine the reinitialized pose of the robotic device is successful; and reinitialize to determine the reinitialized pose of the robotic device in response to determining that reinitializing to determine the reinitialized pose of the robotic device is unsuccessful.

11. The robotic device of claim 8, wherein the processor is further configured with processor-executable instructions to relocate to determine the relocated pose of the robotic device by:

capturing sensor data of a first feature of the environment;

comparing the captured sensor data with stored sensor data for a plurality of features of the environment;

identify a second feature of the environment from the plurality of features of the environment having stored sensor data matching the captured sensor data;

locating the first feature of the environment in relation to the second feature of the environment;

determining the relocated pose of the robotic device in relation to the environment; and tracking the robotic device based on the relocated pose of the robotic device.

12. The robotic device of claim 11, wherein the processor is further configured with processor-executable instructions to:

retrieve stored descriptor-based features of the second feature of the environment; and compare the stored descriptor-based features of the second feature of the environment with the captured sensor data, wherein the processor is further configured with processor-executable instructions to locate the first feature of the environment in relation to the second feature of the environment by locating the first feature of the environment in relation to the second feature of the environment based on comparing the stored descriptor-based features of the second feature of the environment with the captured sensor data.

13. The robotic device of claim 8, wherein the processor is further configured with processor-executable instructions reinitialize to determine the reinitialized pose of the robotic device by:

retrieving a pose of the robotic device that was obtained before tracking of the robotic device was lost;

retrieving sensor data captured since tracking of the robotic device was lost; and reinitializing to determine the reinitialized pose of the robotic device using the pose that was obtained before tracking of the robotic device was lost of the robotic device and the sensor data captured since tracking of the robotic device was lost.

14. The robotic device of claim 13, wherein the processor is further configured with processor-executable instructions to:

determine the reinitialized pose of the robotic device in relation to the environment; and correlate the reinitialized pose of the robotic device with a stored map of the environment.

15. The robotic device of claim 8, wherein:

the memory includes a map database configured to store map data;

the sensor is configured to capture sensor data; and the robotic device further comprises:

a reinitializing module communicatively connected to the processor, to the sensor, and to the memory; and a relocating module communicatively connected to the processor, to the sensor, and to the memory, wherein the reinitializing module and the relocating module are configured to share sensor data captured by the sensor and map data stored in the map database.

16. A robotic device, comprising:

means for determining a pose of the robotic device in an environment;

means for determining whether tracking of the robotic device is lost; and means for simultaneously relocating to determine a relocated pose of the robotic device and reinitializing to determine a reinitialized pose of the robotic device in response to failing to determine the pose of the robotic device in the environment and determining that tracking of the robotic device is lost.

17. A computing device for use in a robotic device and configured to:

determine a pose of the robotic device in an environment;

determine whether tracking of the robotic device is lost; and simultaneously relocate to determine a relocated pose of the robotic device and reinitialize to determine a reinitialized pose of the robotic device in response to failing to determine the pose of the robotic device in the environment and determining that tracking of the robotic device is lost.

18. A method of relocation and reinitialization of a robotic device, comprising:

determining a pose of the robotic device in an environment;

determining whether tracking of the robotic device is lost;

pre-relocating to determine a pre-relocated pose of the robotic device in the environment in response to failing to determine the pose of the robotic device in the environment and determining that tracking of the robotic device is lost;

relocating to determine a relocated pose of the robotic device in response to successfully pre-relocating to determine the pre-relocated pose of the robotic device; and reinitializing to determine a reinitialized pose of the robotic device in response to unsuccessfully pre-relocating to determine the pre-relocated pose of the robotic device.

19. The method of claim 18, wherein pre-relocating to determine the pre-relocated pose of the robotic device in the environment comprises:

retrieving a pose of the robotic device on a planned path to a next goal;

retrieving stored sensor data associated with the pose of the robotic device on the planned path to the next goal;

retrieving stored descriptor-based features of a first feature of the environment associated with the pose of the robotic device on the planned path to the next goal;

determining whether the descriptor-based features of the first feature exceeds a feature threshold;

indicating that pre-relocating to determine the pre-relocated pose of the robotic device is successful in response to determining that the descriptor-based features of the first feature exceeds the feature threshold; and indicating that pre-relocating to determine the pre-relocated pose of the robotic device is unsuccessful in response to determining that the descriptor-based features of the first feature do not exceed the feature threshold.

20. The method of claim 18, further comprising:

determining whether relocating to determine the relocated pose of the robotic device is successful;

tracking the robotic device based on the relocated pose of the robotic device in response to determining that relocating to determine the relocated pose of the robotic device is successful;

determining whether reinitializing to determine the reinitialized pose of the robotic device is successful; and tracking the robotic device based on the reinitialized pose of the robotic device in response to determining that reinitializing to determine the reinitialized pose of the robotic device is successful.

21. The method of claim 18, further comprising:

determining whether relocating to determine the relocated pose of the robotic device is successful;

relocating the relocated pose of the robotic device in response to determining that relocating to determine the relocated pose of the robotic device is unsuccessful;

determining whether reinitializing the reinitialized pose of the robotic device is successful; and reinitializing the reinitialized pose of the robotic device in response to determining that reinitializing to determine the reinitialized pose of the robotic device is unsuccessful.

22. The method of claim 18, wherein relocating to determine the relocated pose of the robotic device comprises:

capturing sensor data of a first feature of the environment;

comparing the captured sensor data with stored sensor data associated with a second feature of the environment associated with a pose of the robotic device on a planned path to a next goal;

locating the first feature of the environment in relation to the second feature of the environment;

determining the relocated pose in relation to the environment; and tracking the robotic device based on the relocated pose.

23. The method of claim 22, further comprising:
retrieving stored descriptor-based features of the second feature of the environment; and
comparing the stored descriptor-based features of the second feature of the environment with the captured sensor data,
wherein locating the first feature of the environment in relation to the second feature of the environment comprises locating the first feature of the environment in relation to the second feature of the environment based on comparing the stored descriptor-based features of the second feature of the environment with the captured sensor data.

24. The method of claim 18, wherein reinitializing to determine the reinitialized pose of the robotic device comprises:
retrieving a pose of the robotic device that was obtained tracking of the robotic device was lost;
retrieving sensor data captured since tracking of the robotic device was lost;
reinitializing the reinitialized pose of the robotic device using the pose of the robotic device that was obtained tracking of the robotic device was lost and the sensor data captured since tracking of the robotic device was lost;
determining the reinitialized pose in relation to the environment; and
correlating the reinitialized pose with a stored map of the environment.

25. A robotic device, comprising:
a memory;
a sensor; and
a processor communicatively connected to the memory and the sensor, and configured with processor-executable instructions to:
determine a pose of the robotic device in an environment;
determine whether tracking of the robotic device is lost;
pre-relocate to determine a pre-relocated pose of the robotic device in the environment in response to failing to determine the pose of the robotic device in the environment and determining that tracking of the robotic device is lost;
relocate to determine a relocated pose of the robotic device in response to successfully pre-relocating to determine the pre-relocated pose of the robotic device; and
reinitialize to determine a reinitialized pose of the robotic device in response to unsuccessfully pre-relocating to determine the pre-relocated pose of the robotic device.

26. The robotic device of claim 25, wherein the processor is further configured with processor-executable instructions to:
retrieve a pose of the robotic device on a planned path to a next goal;
retrieving stored sensor data associated with the pose of the robotic device on the planned path to the next goal;
retrieve stored descriptor-based features of a first feature of the environment associated with the pose of the robotic device on the planned path to the next goal;
determine whether the descriptor-based features of the first feature exceeds a feature threshold;
indicate that pre-relocating to determine the pre-relocated pose of the robotic device is successful in response to determining that the descriptor-based features of the first feature exceeds the feature threshold; and
indicate that pre-relocating to determine the pre-relocated pose of the robotic device is unsuccessful in response to determining that the descriptor-based features of the first feature do not exceed the feature threshold.

27. The robotic device of claim 25, wherein the processor is further configured with processor-executable instructions to:
determine whether relocating to determine the relocated pose of the robotic device is successful;
track the robotic device based on the relocated pose of the robotic device in response to determining that relocating to determine the relocated pose of the robotic device is successful;
determine whether reinitializing to determine the reinitialized pose of the robotic device is successful; and
track the robotic device based on the reinitialized pose of the robotic device in response to determining that reinitializing to determine the reinitialized pose of the robotic device is successful.

28. The robotic device of claim 25, wherein the processor is further configured with processor-executable instructions to:
determine whether relocating to determine the relocated pose of the robotic device is successful;
relocate the relocated pose of the robotic device in response to determining that relocating to determine the relocated pose of the robotic device is unsuccessful;
determine whether reinitializing the reinitialized pose of the robotic device is successful; and
reinitialize the reinitialized pose of the robotic device in response to determining that reinitializing to determine the reinitialized pose of the robotic device is unsuccessful.

29. The robotic device of claim 25, wherein the processor is further configured with processor-executable instructions to relocate to determine the relocated pose of the robotic device by:
capturing sensor data of a first feature of the environment;
comparing the captured sensor data with stored sensor data associated with a second feature of the environment associated with a fifth pose of the robotic device on a planned path to a next goal;
locating the first feature of the environment in relation to the second feature of the environment;
determining the relocated pose in relation to the environment; and
tracking the robotic device based on the relocated pose.

30. The robotic device of claim 29, wherein the processor is further configured with processor-executable instructions to:
retrieve stored descriptor-based features of the second feature of the environment; and
compare the stored descriptor-based features of the second feature of the environment with the captured sensor data,
wherein the processor is further configured with processor-executable instructions to relocate the first feature of the environment in relation to the second feature of the environment by locating the first feature of the environment in relation to the second feature of the environment based on comparing the stored descriptor-based features of the second feature of the environment with the captured sensor data.

31. The robotic device of claim 25, wherein the processor is further configured with processor-executable instructions to reinitialize to determine the reinitialized pose of the robotic device by:

retrieving a pose of the robotic device that was obtained tracking of the robotic device was lost;
retrieving sensor data captured since tracking of the robotic device was lost;
reinitializing the reinitialized pose of the robotic device using the pose of the robotic device that was obtained tracking of the robotic device was lost and the sensor data captured since tracking of the robotic device was lost;
determining the reinitialized pose in relation to the environment; and
correlating the reinitialized pose with a stored map of the environment.

32. The robotic device of claim 25, wherein:
the memory includes a map database configured to store map data;
the sensor is configured to capture sensor data; and
the robotic device further comprises:
a reinitializing module communicatively connected to the processor, to the sensor, and to the memory; and
a relocating module connected to the processor, to the sensor, and to the memory,
wherein the reinitializing module and the relocating module are configured to share sensor data captured by the sensor and map data stored in the map database.

33. A robotic device, comprising:
means for determining a pose of the robotic device in an environment;
means for determining whether tracking of the robotic device is lost;
means for pre-relocating to determine a pre-relocated pose of the robotic device in the environment in response to failing to determine the pose of the robotic device in the environment and determining that tracking of the robotic device is lost;
means for relocating to determine a relocated pose of the robotic device in response to successfully pre-relocating to determine the pre-relocated pose of the robotic device; and
means for reinitializing to determine a reinitialized pose of the robotic device in response to unsuccessfully pre-relocating to determine the pre-relocated pose of the robotic device.

34. A computing device for use in a robotic device and configured to:
determine a pose of the robotic device in an environment;
determine whether tracking of the robotic device is lost;
pre-relocate to determine a pre-relocated pose of the robotic device in the environment in response to failing to determine the pose of the robotic device in the environment and determining that tracking of the robotic device is lost;
relocate to determine a relocated pose of the robotic device in response to successfully pre-relocating to determine the pre-relocated pose of the robotic device; and
reinitialize to determine a reinitialized pose of the robotic device in response to unsuccessfully pre-relocating to determine the pre-relocated pose of the robotic device.

\* \* \* \* \*